(12) United States Patent
Takeuchi et al.

(10) Patent No.: US 11,045,797 B2
(45) Date of Patent: Jun. 29, 2021

(54) FILTER

(71) Applicant: FUJIFILM BUSINESS INNOVATION CORP., Tokyo (JP)

(72) Inventors: Sakae Takeuchi, Minamiashigara (JP); Hiroyoshi Okuno, Minamiashigara (JP); Hideaki Yoshikawa, Minamiashigara (JP); Takeshi Iwanaga, Minamiashigara (JP); Yuka Zenitani, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 236 days.

(21) Appl. No.: 16/379,921

(22) Filed: Apr. 10, 2019

(65) Prior Publication Data

US 2020/0094235 A1    Mar. 26, 2020

(30) Foreign Application Priority Data

Sep. 26, 2018    (JP) .............................. JP2018-179873

(51) Int. Cl.
| | | |
|---|---|---|
| *B01D 46/00* | (2006.01) | |
| *B01J 35/00* | (2006.01) | |
| *B01D 53/88* | (2006.01) | |
| *B01J 21/06* | (2006.01) | |

(52) U.S. Cl.
CPC ........ *B01J 35/004* (2013.01); *B01D 46/0038* (2013.01); *B01D 53/885* (2013.01); *B01J 21/063* (2013.01); *B01D 2255/20707* (2013.01); *B01D 2255/802* (2013.01)

(58) Field of Classification Search
CPC ............ B01D 46/0027; B01D 46/0038; B01D 53/885; B01D 2255/20707; B01D 2255/30; B01D 2255/705; B01D 2255/802; B01D 2257/406; B01D 2257/90; B01D 2258/06; B01D 2259/802; B01D 2275/30; B01J 21/063; B01J 21/08; B01J 35/0013; B01J 35/004
USPC ................ 55/523, 524; 422/5, 122; 502/350
See application file for complete search history.

(56) References Cited

U.S. PATENT DOCUMENTS

| | | | |
|---|---|---|---|
| 7,704,913 B2 | 4/2010 | Tani et al. | |
| 2004/0179978 A1* | 9/2004 | Kobayashi | ............. B01J 35/004 422/121 |
| 2008/0173177 A1* | 7/2008 | Liu | ........................ B01D 53/72 95/285 |

(Continued)

FOREIGN PATENT DOCUMENTS

| | | |
|---|---|---|
| JP | 4222489 B2 | 2/2009 |
| JP | 4803653 B2 | 10/2011 |

(Continued)

*Primary Examiner* — Frank M Lawrence, Jr.
(74) *Attorney, Agent, or Firm* — Oliff PLC

(57) ABSTRACT

A filter includes a filter medium having an average pore size of 1 to 5 mm, and photocatalyst particles deposited on the filter medium. The photocatalyst particle contains a titanium compound particle and a metal compound bonded to the surface of the titanium compound particle with an oxygen atom. The metal compound contains a metal atom and a hydrocarbon group. The titanium compound particle has absorption at wavelengths of 450 nm and 750 nm in the visible absorption spectrum of the titanium compound particle.

13 Claims, 4 Drawing Sheets

(56) References Cited

U.S. PATENT DOCUMENTS

| | | | |
|---|---|---|---|
| 2016/0129432 A1* | 5/2016 | Ozaki | B01J 35/0013 |
| | | | 423/245.1 |
| 2018/0001312 A1 | 1/2018 | Shibai et al. | |
| 2020/0179910 A1* | 6/2020 | Park | B01J 23/42 |

FOREIGN PATENT DOCUMENTS

| | | |
|---|---|---|
| JP | 5083295 B2 | 11/2012 |
| JP | 5344489 B2 | 11/2013 |
| JP | 6078336 B2 | 2/2017 |
| JP | 2018-4996 A | 1/2018 |

\* cited by examiner

FILTER

CROSS-REFERENCE TO RELATED APPLICATIONS

This application based on and claims priority under 35 USC 119 from Japanese Patent Application No. 2018-179873 filed Sep. 26, 2018.

BACKGROUND (i) Technical Field

The present disclosure relates to a filter (ii) Related Art

Methods in which contaminations and odorants are decomposed and removed by a photocatalytic action in order to clean air or water are known. For example, there have been proposed various types of cleaning apparatuses that include a filter composed of nonwoven fabric or the like, the filter being provided with photocatalyst particles, such as anatase titanium oxide particles, deposited on the surfaces of the fibers of the nonwoven fabric or the like, and decompose contaminations and odorous components adsorbed on the filter by irradiating the filter with ultraviolet (UV) light. Various types of filters that contain photocatalyst part deposited thereon have been proposed.

For example, Japanese Patent No. 6078336 discloses a photocatalyst carrier that includes a flexible porous body coated with a metal and a photocatalyst deposited on the flexible porous body, the metal being titanium, the photocatalyst being titanium dioxide.

Japanese Patent No. 5083295 discloses a photocatalyst carrier that includes organic fibers having plural micropores formed therein as a result of pore formation by a pore formation method and a photocatalyst deposited on the surfaces of the organic fibers so as to form a coating film having an adequate thickness at which the micropores are not completely filled with the coating film, the organic fibers being transmissible to light.

Japanese Laid Open Patent Application Publication. No. 2018-004996 discloses a photocatalyst filter that includes a sheet-like filter base and a photocatalyst layer deposited on the filter base, the photocatalyst layer acting as a photocatalyst upon receiving light having a wavelength of 400 nm or more, the photocatalyst filter having an opening ratio of 35% or more and 80% or less.

Japanese Patent No. 5344489 discloses visible light-responsive, three-dimensional microcell structure photocatalyst filter that includes a sponge-like porous structure (A) having a porosity of 85 volume % or more and an anatase titanium oxide coating film deposited on the surface of the spongelike porous structure (A), the sponge-like porous structure (A) having a sponge-like porous structure (B) including silicon carbide and silicon, the sponge-like porous structure (B) being constituted by a sponge-like skeleton having an average crosslink width of 1 mm or less, the molar ratio of the silicon to the silicon carbide (Si/SiC) being 0.1 to 4.

Japanese Patent No. 4803653 discloses a visible light-responsive, three-dimensional microcell structure photocatalyst filter that includes a sponge-like porous structure (A) having a porosity of 85 volume % or more and an anatase titanium oxide coating film deposited on the surface of the sponge-like porous structure (A), the sponge-like porous structure (A) having a sponge-like porous structure (B) being composed of at east one set of materials selected from the groups consisting of (1) amorphous carbon and silicon, (2) silicon and silicon carbide, (3) amorphous carbon, and (4) titanium and carbon.

Japanese Patent No. 4222489 discloses a translucent honeycomb structure that has an average opening size of 50 to 200 μm and a specific surface area of 100 to 1500 $m^2/g$ and is composed of silica gel.

SUMMARY

In the filters that contain photocatalyst particles deposited thereon which are proposed in the related art, increasing the average pore size of a filter in order to enhance the transmittance of light through the filter degrades the deodorizing power of the filter. On the other hand, reducing the average pore size of a filter also degrades the deodorizing power of the filter.

Aspects of non-limiting embodiments of the present disclosure relate to a filter having a higher deodorizing power than a filter that includes a filter medium having an average pore size of 1 mm or more and 5 mm or less and photocatalyst particles deposited on the filter medium, the photocatalyst particle containing a titanium compound particle that does not have absorption at wavelengths of 450 nm and 750 nm in the visible absorption spectrum of the titanium compound particle.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a filter including a filter medium having an average pore size of 1 to 5 mm, and photocatalyst particles deposited on the filter medium. Each photocatalyst particle contains a titanium compound particle and a metal compound bonded to a surface of the titanium compound particle with an oxygen atom. The metal compound contains a metal atom and a hydrocarbon group. The titanium compound particle has absorption at wavelengths of 450 nm and 750 nm in a visible absorption spectrum of the titanium compound particle.

BRIEF DESCRIPTION OF THE DRAWINGS

An exemplary embodiment of the present disclosure will be described in detail based on the following figures, wherein.

DETAILED DESCRIPTION

Figure 1:
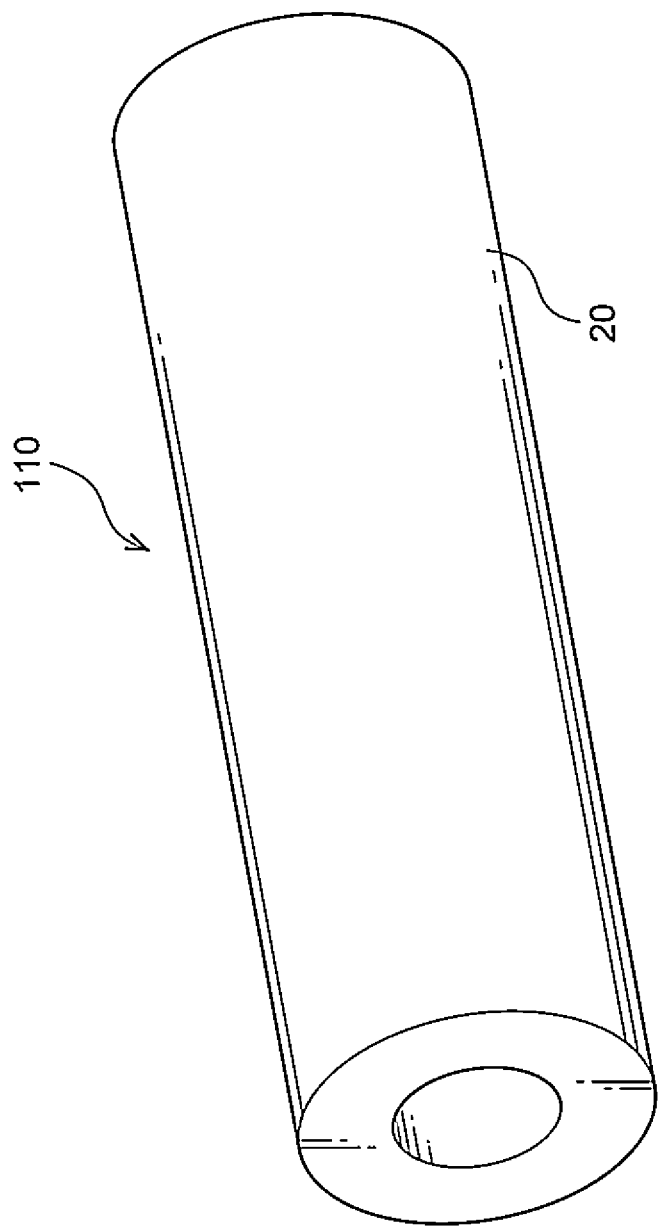
FIG. 1 is a schematic perspective view of an example of a filter according to an exemplary embodiment.

An exemplary embodiment of the present disclosure is described below. The following description and examples are merely illustrative of the exemplary embodiment and do not limit the scope of the present disclosure.

Hereinafter, in the case where a composition contains plural substances that correspond to a constituent of the composition, the content of the constituent in the composition is the total content of the plural substances in the composition unless otherwise specified.

The term "step" used herein refers not only to an individual step but also to a step that is not distinguishable from other steps but achieves the intended purpose of the step.

The abbreviation "XPS" used herein refers to X-ray photoelectron spectroscopy.

A filter according to this exemplary embodiment includes a filter medium having an average pore size of 1 mm or more and 5 mm or less and photocatalyst particles deposited on the filter medium.

The photocatalyst particle contains a titanium compound particle and a metal compound bonded to the surface of the titanium compound particle with an oxygen atom. The metal compound contains a metal atom and a hydrocarbon group. The titanium compound particle has absorption at wavelengths of 450 nm and 750 nm in the visible absorption spectrum of the titanium compound particle (hereinafter, this titanium compound particle is referred to as "specific titanium compound particle").

The filter according to this exemplary embodiment may have a high deodorizing power. The reasons for this are presumably as follows.

In the filters proposed in the related art on which photocatalyst particles are deposited, increasing the average pore size of a filter in order to enhance the transmittance of light through the filter reduces the likelihood of odorous components being adsorbed to the photocatalyst particles and degrades the deodorizing power of the filter. Specifically, when the average pore size of a filter is increased, the amount of air or liquid that passes through the filter increases accordingly. The increase in the amount of air or liquid that passes through the filter results in a reduction in the likelihood of odorous components coming into contact with the surfaces of the photocatalyst particles. This reduces the deodorizing power of the filter.

On the other hand, reducing the average pore size of a filter reduces the transmittance of light through the filter and limits the photocatalytic activity of the photocatalyst particles. As a result, the deodorizing power of the filter may become degraded.

In contrast, the "specific titanium compound particle" used as a photocatalyst particle, which is provided with a metal compound bonded to the surface of the titanium compound particle with an oxygen atom, the metal compound containing a metal atom and a hydrocarbon group, has a highly adhesive surface and therefore has a high capability to adsorb odorous components. Furthermore, since the specific titanium compound particle is highly hydrophobic, the dispersibility of the specific titanium compound particles is high accordingly.

In addition, since the specific titanium compound particle has absorption at wavelengths of 450 nm and 750 nm in the visible absorption spectrum of the specific titanium compound particle, the specific titanium compound particle produces high photocatalytic performance in the wavelength range of visible light.

When the above-described photocatalyst particles having high dispersibility, high adsorbing power, and high photocatalytic performance are deposited on a filter medium having an average pore size of 1 mm or more and 5 mm or less, the photocatalyst particles having a high adsorbing power are deposited on the filter medium in a substantially uniform manner. This enables the amount of odorous components adsorbed to the photocatalyst particles to be increased while increasing the amount of air or liquid that passes through the filter. Consequently, a filter having a markedly high deodorizing power may be produced.

For the above reasons, it is considered that the filter according to this exemplary embodiment may have a markedly high deodorizing power.

Moreover, since the photocatalyst particle contained in the filter according this exemplary embodiment, which contains the specific titanium compound particles, has a highly adhesive surface, the likelihood of the photocatalyst particles becoming detached from the filter medium is small and, as a result, the deodorizing power of the filter may be maintained for a long period of time.

An example of the filter according to this exemplary embodiment is described below with reference to the attached drawings.

A filter 110 according to this exemplary embodiment includes a filter medium 20 and photocatalyst particles 10 deposited on the filter medium 20 as illustrated in FIG. 1.

Filter Medium

The filter medium 20 is a filter on which the photocatalyst particles 10 are to be deposited.

The filter medium 20 is a Member that is permeable to air and liquids and serves as a filter.

The filter medium 20 may be a flexible member or a stiff member. In other words, the filter medium 20 may, but does not necessarily, have a self-supporting capability.

The average pore size of the filter medium 20 is 1 mm or more and 5 mm or less and is larger than, for example, the size of the photocatalyst particles.

Specifically, the average Pore size of the filter medium 20 is preferably 1 mm or more and 4 μm or less and is more preferably 1.5 μm or more and 3 μm or less.

The average pore size of the filter medium 20 is determined by the following method.

An image of the filter medium 20 is taken with a scanning electron microscope "S-4100" produced by Hitachi, Ltd. When the image is taken, the magnifying power of the scanning electron microscope is adjusted such that plural pores of the filter medium 20 can be observed. The average pore size of the filter medium 20 is measured using the image.

In the case where, for example, the filter medium 20 is composed of a porous body, such as a ceramic porous body, the pores are oval or have no regular shape. In such a case, the length of the major axis of a pore (i.e., the maximum diameter of the pore) is considered as a pore size.

In the case where, for example, the filter medium 20 is composed of a fibrous material, such as nonwoven fabric or woven fabric, the fibers may overlap one another at the positions of the pores. Thus, in such a case, the maximum diameter of a pore that penetrates through the filter medium 20 in the thickness direction (i.e., a gap that reveals the background of the filter medium 20) is considered as a pore size.

The diameter of a pore is measured at 10 to 50 positions, and the average thereof is considered as the average pore size of the filter medium 20.

The average pore size of the filter medium 20 is the average pore size of the material (e.g., a fibrous material; a resin porous body, such as a resin porous membrane or a sponge; a metal porous body; or a ceramic porous body) constituting the filter medium, which is described below.

Examples of the material constituting the filter medium 20 include a fibrous material; a resin porous body, such as a resin porous membrane or a sponge; a metal porous body; and a ceramic porous body.

Examples of the fibrous material include woven fabric, knitted fabric, and nonwoven fabric. The fibrous material is preferably selected from woven fabrics and knitted fabrics made of cotton, silk, polyester fibers, and nylon fibers; and nonwoven fabrics made of cotton, polyester fibers, polyethylene fibers, polypropylene fibers, acrylic fibers, nylon fibers, vinylon fibers, cellulose fibers, aramid fibers, and glass fibers. The diameter of fibers constituting the fibrous material is preferably 0.5 μm or more and 50 μm or less and is more preferably 1 μm or more and 20 μm or less in order to enhance the performance of the filter 110, such as the air permeability, liquid permeability, flexibility, and stiffness of the filter 110 and ease of adhesion (i.e., deposition) of the photocatalyst particles to the filter 110.

Examples of the resin porous body include resin porous membranes composed of polyvinylidene fluoride (PVDF), polytetrafluoroethylene (PTFE), polyethersulfone, and the like; and sponges composed of urethane, polypropylene, and the like.

Examples of the paper include cellulose filter paper.

Examples of the metal porous body include metal porous bodies formed by baking a metal such as SUS, aluminum, or nickel or an alloy of these metals.

Examples of the ceramic porous body include a ceramic porous body formed by baking a ceramic material.

Among the above materials, a ceramic porous body is preferably used as a material constituting the filter medium 20 in order to enhance the ability of the photocatalyst to decompose organic substances. In other words, the filter medium 20 may be composed of a ceramic material.

The shape of the filter medium 20 is not limited and may be any known shape, such as plate-like, solid cylindrical, hollow cylindrical, solid prismatic, or hollow prismatic. The filter medium 20 illustrated in FIG. 1 is hollow cylindrical.

The filter medium 20 may have a honeycomb structure that includes the above material constituting the filter medium 20.

Photocatalyst Particles

Figure 2:
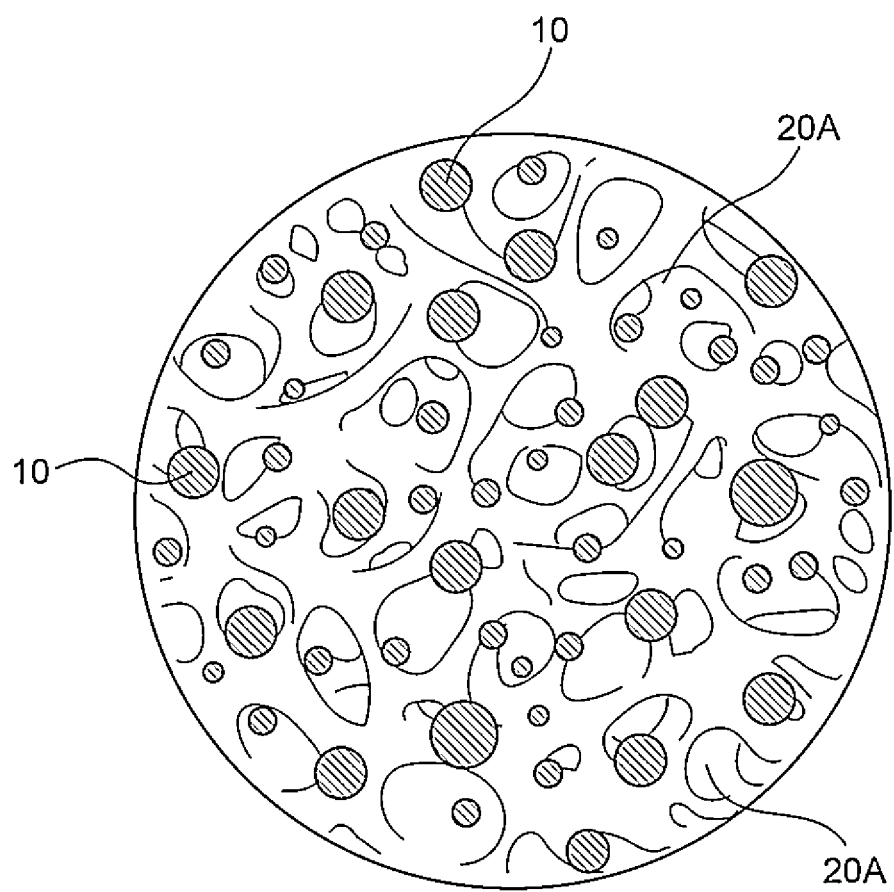
FIG. 2 is an enlarged schematic view of an example of a filter according to an exemplary embodiment.

The photocatalyst particles 10 are deposited on, for example, the side surfaces of pores 20A formed in the filter medium 20 (in the case where the filter medium 20 is composed of a fibrous material, the surfaces of the fibers constituting the pores 20A) (see FIG. 2).

Figure 3:
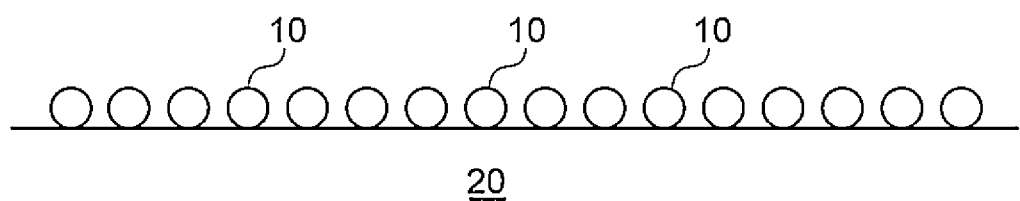
FIG. 3 is a schematic diagram illustrating the state of photocatalyst particles deposited on a filter medium.

For example, in the case where the photocatalyst particles 10 are metatitanic acid particles or titanium oxide particles, the photocatalyst particles 10 may be deposited on the side surfaces of the pores 20A of the filter medium 20 in the form of primary particles as illustrated in FIG. 3.

Figure 4:
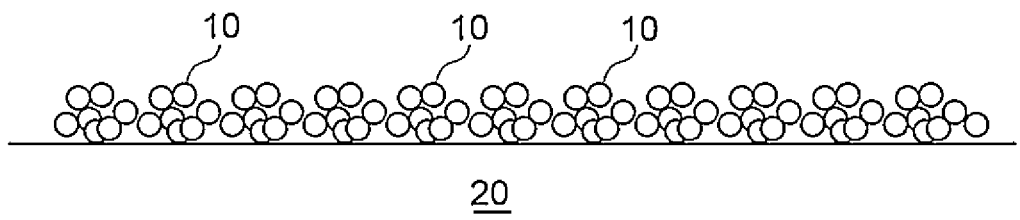
FIG. 4 is a schematic diagram illustrating the state of photocatalyst particles deposited on a filter medium.

For example, in the case where the photocatalyst particles 10 are titanium oxide aerogel particles or silica-titania composite aerogel particles, the photocatalyst particles 10 may be deposited on the side surfaces of the pores 20A of the filter medium 20 in the form of aggregates having an aerogel structure as illustrated in FIG. 4.

The term "aerogel structure" used herein refers to a structure formed by primary particles aggregating while forming a porous structure. The aerogel structure is a cluster structure formed by aggregation of particulate matter having a diameter of the order of nanometers. The inside of the aerogel structure is a three dimensional, fine network structure.

The details of the photocatalyst particles 10 are described below. Reference numerals are omitted in the following description.

The photocatalyst particles have absorption at wavelengths of 450 nm and 750 nm in the visible absorption spectrum of the photocatalyst particles and therefore produce high photocatalytic performance upon receiving visible light.

Specifically, the photocatalyst particle contains a metal compound containing a metal atom and a hydrocarbon group, the metal compound being bonded to the surface of the photocatalyst particle with an oxygen atom.

The photocatalyst particles each of which contains a metal compound containing a metal atom and a hydrocarbon group, the metal compound being bonded to the surface of the photocatalyst particle with an oxygen atom, may be produced by, for example, treating the surfaces of untreated Particles (e.g., metatitanic acid particles, titanium oxide particles, titanium oxide aerogel particles, or silica-titania composite aerogel particles that have not been treated) with a metal compound having a hydrocarbon group and subsequently oxidizing at least a part of the hydrocarbon group into a C—O linkage or a C=O linkage by heating. Although the detailed mechanisms are not clear, it is considered that, since the structure constituted by an organometallic compound in which carbon atoms have been oxidized at an adequate degree, an oxygen atom, and a titanium or silicon atom that are covalently bonded to one another in this order is present on the surfaces of the particles, the surfaces of the particles absorb light at wavelengths of 450 nm and 750 nm and the particles produce photocatalytic performance upon receiving visible light (i.e., visible light responsivity).

Hereinafter, the metal compound containing a metal atom and a hydrocarbon group is referred to simply as "organometallic compound".

The photocatalyst particles are capable of producing high photocatalytic performance even in the wavelength range of visible light. The photocatalyst particles are also suitable for the following reasons.

Since untreated particles (e.g., metatianic acid particles, titanium oxide particles, titanium oxide aerogel particles, or silica-titania composite aerogel particles that have not been treated) typically have high hydrophilicity and are highly likely to aggregate, the dispersibility of the untreated particles in the filter medium and the adhesion of the untreated particles to the filter medium are likely to be poor.

In contrast, the photocatalyst particle has a hydrocarbon group present on the surface of the photocatalyst particle, which is derived from the organometallic compound. This enhances the hydrophobicity of the photocatalyst particles, the dispersibility of the photocatalyst particles in the filter medium, and the adhesion of the photocatalyst particles to the filter medium. Consequently, the photocatalyst particles are capable of adhering on the surface of the filter medium in a substantially uniform manner. Furthermore, the detachment of the photocatalyst particles from the filter medium is reduced.

Untreated Particles

Examples of the particle the surface of which is to be treated with an organometallic compound, that is, the untreated particle, include an untreated titanium compound particle. Examples of the untreated titanium compound particle include an untreated metatitanic acid particle, an untreated titanium oxide particle, an untreated titanium oxide aerogel particle, and an untreated silica-titania composite aerogel particle. Among the above untreated particle, an untreated metatitanic acid particle is preferable in order to enhance the deodorizing power of the filter.

That is, the photocatalyst particle may be at least one type of particle selected from the group consisting of a metatitanic acid particle, a titanium oxide particle, a titanium oxide aerogel particle, and a silica-titania composite aerogel particle and is preferably metatitanic acid particle.

In the case where the photocatalyst particles are deposited on the surface of the filter medium in the form of aggregates having an aerogel structure, the untreated titanium compound particle may be at least one type of particle selected from an untreated titanium oxide aerogel particle and an untreated silica-titania composite aerogel particle.

Untreated Metatitanic Acid Particle

The untreated metatitanic acid particle is a particle of titanium acid that is a titanate hydrate represented by $TiO_2 \cdot nH_2O$ with n being 1.

Examples of the method for producing the untreated metatitanic acid particle include, but are not limited to, a chlorine method (gas-phase method) and a sulfuric acid method (liquid-phase method). A sulfuric acid method (liquid-phase method) is preferable.

An example of the sulfuric acid method (liquid-phase method) is described below. Ilmenite ores ($FeTiO_3$) or titanium slag, which is a raw material, is dissolved in concentrated sulfuric acid. Iron, which is an impurity, is separated in the form of iron sulfate ($FeSO_4$). Hereby, titanium oxysulfate ($TiOSO_4$) is prepared (titanyl sulfate solution). The titanium oxysulfate ($TiOSO_4$) is hydrolyzed in order to prepare untreated metatitanic acid [titanium oxyhydroxide ($TiO(OH)_2$)] particles.

Untreated Titanium Oxide Particle

Examples of the untreated titanium oxide particle include a brookite titanium oxide particle, an anatase titanium oxide particle, and a rutile titanium oxide particle. The titanium oxide particle may have a brookite, anatase, or rutile single-crystal structure or a mixed-crystal structure in which the above crystals coexist.

Examples of the method for producing the untreated titanium oxide particle include, but are not limited to, a chlorine method (gas-phase method) and a sulfuric acid method (liquid-phase method).

Untreated Titanium Oxide Aerogel Particle

The untreated titanium oxide aerogel particle may be produced by a sol-gel process in which titanium alkoxide is used as a raw material.

The untreated titanium oxide aerogel particle may be produced by hydrolysis and condensation of titanium alkoxide. In such a case, some of the alkoxy groups of the titanium alkoxide may remain unreacted in the particle.

The method for producing the untreated titanium oxide aerogel particle is described below.

The method for producing the untreated titanium oxide aerogel particle may include at least the steps (1) and (2) below.

(1) a step in which porous particles that contain titanium oxide are formed by a sol-gel process, and a dispersion liquid that contains the porous particles and a solvent is prepared (hereinafter, this step is referred to as "dispersion liquid preparation step").

(2) a step in which the solvent is removed from the dispersion liquid with supercritical carbon dioxide (hereinafter, this step is referred to as "solvent removal step").

(1) Dispersion Liquid Preparation Step

In the dispersion liquid preparation step, for example, titanium oxide is produced by the reaction (i.e., hydrolysis and condensation) of titanium alkoxide used as a raw material, and a dispersion liquid that contains porous particles containing titanium oxide and a solvent in which the porous particles are dispersed is prepared.

Specifically, the dispersion liquid preparation step is, for example, the step described below.

Titanium alkoxide is added to alcohol. While the resulting mixture is stirred, an aqueous solution of an acid is added dropwise to the mixture in order to cause the reaction of the titanium alkoxide, which produces titanium oxide. Hereby, a dispersion liquid that contains porous particles containing titanium oxide and alcohol in which the porous particles are dispersed is prepared (hereinafter, this dispersion liquid is referred to as "porous particle dispersion liquid").

The primary particle size of the porous particles can be controlled by adjusting the amount of titanium alkoxide used in the dispersion liquid preparation step. The larger the amount of titanium alkoxide used, the smaller the primary particle size of the porous particles. The ratio of the mass of titanium alkoxide to the mass of alcohol is preferably 0.04 or more and 0.65 or less and is more preferably 0.1 or more and 0.5 or less.

Examples of the titanium alkoxide used in the dispersion liquid preparation step include tetraalkoxy titaniums, such as tetramethoxy titanium, tetraethoxy titanium, tetrapropoxy titanium, and tetrabutoxy titanium; and alkoxy titanium chelates some of the alkoxy groups of which are chelated, such as di-i-propoxy-bis(ethyl acetate) titanium and di-i-propoxy-bis(acetylacetonate)titanium. The above titanium alkoxides may be used alone or in combination of two or more.

The titanium oxide aerogel particle may contain a small amount of metal elements other than titanium, such as silicon and aluminum. Examples of the material that may be used for adding such a metal element to the titanium oxide aerogel particle include tetraalkoxysilanes, such as tetramethoxysilane, tetraethoxysilane, tetrapropoxysilane, and tetrabutoxysilane; alkyltrialkoxysilanes, such as methyltrimethoxysilane, methyltriethoxysilane, and ethyltriethoxysilane; alkyldialkoxysilanes, such as dimethyldimethoxysilane and dimethyldiethoxysilane; and aluminum alkoxides, such as aluminum isopropoxide. In the case where the titanium oxide aerogel particle contains silicon, the element ratio of silicon to titanium (Si/Ti) contained in the titanium oxide aerogel particle is set to be within the range of 0 to 0.05.

Examples of the alcohol used in the dispersion liquid preparation step include methanol, ethanol, propanol, and butanol. These alcohols may be used alone or in combination of two or more.

Examples of the acid included in the aqueous solution of an acid which is used in the dispersion liquid preparation step include oxalic acid, acetic acid, hydrochloric acid, and nitric acid. The concentration of the acid in the aqueous solution of an acid is preferably 0.001% by mass or more and 1% by mass or less and is more preferably 0.005% by mass or more and 0.01% by mass or less.

The amount of aqueous solution of an acid which is used in the dispersion liquid preparation step may be 0.001 parts by mass or more and 0.1 parts by mass or less relative to 100 parts by mass of titanium alkoxide.

The concentration of solid component in the porous particle dispersion liquid prepared in the dispersion liquid preparation step may be 1% by mass or more and 30% by mass or less.

(2) Solvent Removal Step

The solvent removal step is a step in which the dispersion liquid that contains the porous particles and the solvent is brought into contact with supercritical carbon dioxide in order to remove the solvent. The solvent removal treatment using supercritical carbon dioxide reduces the risk of pores of the porous particles becoming closed or clogged compared with a solvent removal treatment using heat. Conducting a solvent removal step in which the solvent is removed using supercritical carbon dioxide makes it possible to produce titanium oxide aerogel particles having a BET specific surface area of 120 m$^2$/g or more.

Specifically, the solvent removal step is conducted, for example, in the following manner.

The porous particle dispersion liquid is charged into a sealed reactor. Liquefied carbon dioxide is introduced to the sealed reactor. Subsequently, while the sealed reactor is heated, the pressure of the inside of the sealed reactor is increased with a high-pressure pump in order to bring the carbon dioxide contained in the sealed reactor into a supercritical state. Then, liquefied carbon dioxide is charged into the sealed reactor to cause the supercritical carbon dioxide to discharge from the sealed reactor. Thereby, the supercritical carbon dioxide is passed through the porous particle dispersion liquid inside the sealed reactor. While the supercritical carbon dioxide is passed through the porous particle dispersion liquid, the solvent dissolves in the supercritical carbon dioxide and is removed from the sealed reactor together with the supercritical carbon dioxide discharging from the sealed reactor.

The temperature and pressure of the inside of the sealed reactor are set to the temperature and pressure at which carbon dioxide is brought into a supercritical state. Since carbon dioxide has critical points of 31.1° C. and 7.38 MPa, the temperature and pressure of the inside of the sealed reactor are set to, for example, 50° C. or more and 200° C. or less and 10 MPa or more and 30 MPa or less.

Untreated Silica-Titania Composite Aerogel Particle

The untreated silica-titania composite aerogel particle contains a silica-titania composite, which is a composite oxide of silicon and titanium, as a principal constituent (i.e., the constituent having the highest proportion among all the constituents of the particles).

The element ratio of silicon to titanium (Si/Ti) contained in the untreated silica-titania composite aerogel particle is preferably more than 0 and 6 or less, is more preferably 0.05 or more and 4 or less, and is further preferably 0.1 or more and 3 or less in order to produce photocatalytic performance in the wavelength range of visible light.

The element ratio of silicon to titanium (Si/Ti) is determined by conducting a qualitative analysis (wide scan analysis) by XPS and preparing the element profiles of the silica-titania composite. Specifically, the following method may be used.

The silica-titania composite is subjected to a qualitative analysis (wide scan analysis) using an XPS analyzer while the surface of the silica-titania composite is etched in the depth direction under the following conditions in order to identify and measure titanium, silicon, and carbon atoms. On the basis of the data obtained from the analysis, an element profile for each of the elements, that is, titanium, silicon, and carbon, is drawn with the vertical axis representing peak intensity and the horizontal axis representing etching time. The profile curves are divided into plural regions in accordance with the inflection points in order to identify the region (i.e., the Region. A described below) in which the peak intensities for titanium and silicon substantially do not change. The element ratio Si/Ti in the specific region is determined.

XPS analyzer: "VERSAPROBE II" produced by ULVAC-PHI, Incorporated
X-ray source: monochromatic AlKα radiation
Accelerating voltage: 15 kV
X-ray beam diameter: 100 μm
Etching gun: argon ion beam
Etching power: 4 kV The total content of the silica constituent and the titania constituent contained in the untreated silica-titania composite aerogel particle is preferably 80% by mass or more, is more preferably 90% by mass or more, and is further preferably 95% by mass or more of the total amount of the composite.

The untreated silica-titania composite aerogel particle may contain a base particle in which the element ratio of silicon to titanium (Si/Ti) is more than 0 and 6 or less and a titania layer (i.e., a layer composed of titania) disposed on the surface of the base particle. That is, the untreated silica-titania composite aerogel particle may have a titania layer as a surface layer. Such silica-titania composite aerogel particles may enhance photocatalytic performance.

The untreated silica-titania composite aerogel particles may be produced by a sol-gel process in which alkoxysilane and titanium alkoxide are used as raw materials.

The untreated silica-titania composite aerogel particles may be produced by hydrolysis and condensation of alkoxysilane and titanium alkoxide. Note that, some of the hydrocarbon groups, such as alkoxy groups, of the alkoxysilane or titanium alkoxide may remain unreacted in the composite.

The method for producing the untreated silica-titania composite aerogel particles is described below.

The method for producing the untreated silica-titania composite aerogel particles may include at least the steps (1') and (2') below.

(1') a step in which porous particles that contain silica-titania composite are formed by a sol-gel process, and a dispersion liquid that contains the porous particles and a solvent is prepared (hereinafter, this step is referred to as "dispersion liquid preparation step").

(2') a step in which the solvent is removed from the dispersion liquid with supercritical carbon dioxide (hereinafter, this step is referred to as "solvent removal step").

(1') Dispersion Liquid Preparation Step

In the dispersion liquid preparation step, for example, a silica-titania composite is produced by the reaction (i.e., hydrolysis and condensation) of alkoxysilane and titanium alkoxide used as raw materials, and a dispersion liquid that contains porous particles having the silica-titania composite and a solvent in which the porous particles are dispersed is prepared. The porous particle may be an aggregated particle formed by primary particles that contain the silica-titanic composite aggregating while forming a porous structure.

Specifically, the dispersion liquid preparation step is, for example, the step described below.

Alkoxysilane and titanium alkoxide are added to alcohol. While the resulting mixture is stirred, an aqueous solution of an acid is added dropwise to the mixture in order to cause the reaction of the alkoxysilane and the titanium alkoxide, which produces a silica-titania composite. Hereby, a dispersion liquid that contains porous particles containing a silica-titanic composite and alcohol in which the porous particles are dispersed is prepared (hereinafter, this dispersion liquid is referred to as "porous particle dispersion liquid").

The element ratio of silicon to titanium (Si/Ti) contained in the untreated silica-titania composite aerogel particle can be controlled by adjusting the mixing ratio between the alkoxysilane and the titanium alkoxide used in the dispersion liquid preparation step.

The size of the primary particles constituting the untreated silica-titania composite aerogel particle and the size of the untreated silica-titania composite aerogel particle can be controlled by adjusting the proportion of the total amount of alkoxysilane and titanium alkoxide to the amount of alcohol which are used in the dispersion liquid preparation step. The higher the proportion of the total amount of alkoxysilane and titanium alkoxide to the amount of alcohol, the smaller the size of the primary particles constituting the untreated silica-titania composite aerogel particle and the larger the size of the untreated silica-titania composite aerogel particle. The total amount of alkoxysilane and titanium alkoxide is preferably 4 parts by mass or more and 250 parts by mass or less and is more preferably 10 parts by mass or more and 50 parts by mass or less relative to 100 parts by mass of alcohol.

Examples of the alkoxysilane used in the dispersion liquid preparation step include tetraalkoxysilanes, such as tetramethoxysilane, tetraethoxysilane, tetrapropoxysilane, and tetrabutoxysilane; alkyltrialkoxysilanes, such as methyltrimethoxysilane, methyltriethoxysilane, and ethyltriethoxysilane; and alkyldialkoxysilanes, such as dimethyldimethoxysilane and dimethyldiethoxysilane. The above alkoxysilanes may be used alone or in combination of two or more.

Examples of the titanium alkoxide used in the dispersion liquid preparation step include tetraalkoxy titaniums, such as tetramethoxy titanium, tetraethoxy titanium, tetrapropoxy titanium, and tetrabutoxy titanium; and alkoxy titanium chelates some of the alkoxy groups of which are chelated, such as di-propoxy-bis(ethyl acetoacetate) titanium and di-i-propoxy-bis(acetylacetonate)titanium. The above titanium al oxides may be used alone or in combination of two or more.

Examples of the alcohol used in the dispersion liquid preparation step include methanol, ethanol, propanol, and butanol. These alcohols may be used alone or in combination of two or more.

Examples of the acid included in the aqueous solution of an acid which is used in the dispersion liquid preparation step include oxalic acid, acetic acid, hydrochloric acid, and nitric acid. The concentration of the acid in the aqueous solution of an acid is preferably 0.001% by mass or more and 1% by mass or less and is more preferably 0.005% by mass or more and 0.01% by mass or less.

The amount of the aqueous solution of an acid which is used in the dispersion liquid preparation step may be 0.001 parts by mass or more and 0.1 parts by mass or less relative to 100 parts by mass of the total amount of alkoxysilane and titanium alkoxide.

The concentration of solid component in the porous particle dispersion liquid prepared in the dispersion liquid preparation step may be 1% by mass or more and 30% by mass or less.

(2') Solvent Removal Step

The solvent removal step is a step in which the dispersion liquid that contains the porous particles and the solvent is brought into contact with supercritical carbon dioxide in order to remove the solvent. The solvent removal treatment using supercritical carbon dioxide reduces the risk of pores of the porous particles (i.e., aggregated particles formed by the primary particles aggregating while forming a porous structure) becoming closed or clogged compared with a solvent removal treatment using heat. Conducting a solvent removal step in which the solvent is removed using supercritical carbon dioxide makes it possible to produce untreated silica-titanic composite aerogel particles having a BET specific surface area of 200 $m^2/g$ or more.

Specifically, the solvent removal step is conducted, for example, in the following manner.

The porous particle dispersion liquid is charged into a sealed reactor. Liquefied carbon dioxide is introduced to the sealed reactor. Subsequently, while the sealed reactor is heated, the pressure of the inside of the sealed reactor is increased with a high-pressure pump in order to bring the carbon dioxide contained in the sealed reactor into a supercritical state. Then, liquefied carbon dioxide is charged into the sealed reactor to cause the supercritical carbon dioxide to discharge from the sealed reactor. Thereby, the supercritical carbon dioxide is passed through the porous particle dispersion liquid inside the sealed reactor. While the supercritical carbon dioxide is passed through the porous particle dispersion liquid, the solvent dissolves in the supercritical carbon dioxide and is removed from the sealed reactor together with the supercritical carbon dioxide discharging from the sealed reactor.

The temperature and pressure of the inside of the sealed reactor are set to the temperature and pressure at which carbon dioxide is brought into a supercritical state. Since carbon dioxide has critical points of 31.1° C. and 7.38 MPa, the temperature and pressure of the inside of the sealed reactor are set to, for example, 50° C. or more and 200° C. or less and 10 MPa or more and 30 MPa or less, in the case where the untreated silica-titania composite aerogel particle that contains a titania layer as a surface layer is produced, the dispersion liquid preparation step (1') described above may include the substeps (i) and (ii) described below.

(i) Alkoxysilane and titanium alkoxide are added to alcohol. While the resulting mixture is stirred, an aqueous solution of an acid is added dropwise to the mixture in order to cause the reaction of the alkoxysilane and the titanium alkoxide, which produces a silica-titania composite. Hereby, a dispersion liquid that contains base particles containing the silica-titania composite and alcohol in which the base particles are dispersed is prepared (hereinafter, this dispersion liquid is referred to as "first dispersion liquid").

(ii) While the first dispersion liquid is stirred, a liquid mixture of alcohol and titanium alkoxide is added dropwise to the first dispersion liquid in order to cause the reaction of the base particles and titanium alkoxide, which produces porous particles each of which contains the base particle and the intermediate layer disposed on the surface of the base particle. Hereby, a dispersion liquid that contains the porous particles and alcohol in which the porous particles are dispersed is prepared (hereinafter, this dispersion liquid is referred to as "second dispersion liquid").

Organometallic Compound

The organometallic compound is a metal compound containing a metal atom and a hydrocarbon group.

The organometallic compound may metal compound composed only of metal atoms, carbon atoms, hydrogen atoms, and oxygen atoms. In such a case, the visible light responsivity of the photocatalyst particles may be further enhanced.

The organometallic compound may be bonded to the surface of the particle with an oxygen atom O directly bonded to the metal atom M contained in the organometallic compound, that is, with a covalent bond represented by M-O-Ti or M-O-Si. In such a case, the visible light responsivity of the photocatalyst particles may be further enhanced.

The organometallic compound may contain a metal atom M and a hydrocarbon group directly bonded to the metal atom M. In such a case, the visible light responsivity of the photocatalyst particles may be further enhanced each an organometallic compound may be bonded to the surface of particle with an O atom directly bonded to the metal atom M contained in the organometallic compound. In other words, structure constituted by a hydrocarbon group, a metal atom M, an oxygen atom O, and a titanium atom Ti or silicon atom Si which are covalently bonded to one another in this order, that is, a structure represented by hydrocarbon group-M-O—Ti or Hydrocarbon group-M-O—Si, may be present on the surface of the particle. In such a case, the visible light responsivity of the photocatalyst particles may be further enhanced.

In the case where the organometallic compound has plural hydrocarbon groups, at least one of the hydrocarbon groups may be directly bonded to the metal atom contained in the organometallic compound.

The state of chemical bonding between the atoms contained in the organometallic compound can be determined by conducting a high resolution analysis (i.e., a narrow scan analysis) by XPS.

The metal atom M contained in the organometallic compound is preferably a silicon atom, an aluminum atom, or a titanium atom, and is more preferably a silicon atom or an aluminum atom, and is particularly preferably a silicon atom.

Examples of the hydrocarbon group contained in the organometallic compound include saturated and unsaturated aliphatic hydrocarbon groups having 1 to 40 carbon atoms, preferably having 1 to 20 carbon atoms, more preferably having 1 to 18 carbon atoms, further preferably having 4 to 12 carbon atoms, and particularly preferably having 4 to 10 carbon atoms; and aromatic hydrocarbon groups having 6 to 27 carbon atoms, preferably having 6 to 20 carbon atoms, more preferably having 6 to 18 carbon atoms, further preferably having 6 to 12 carbon atoms, and particularly preferably having 6 to 10 carbon atoms.

The hydrocarbon group contained in the organometallic compound is preferably an aliphatic hydrocarbon group, is more preferably a saturated aliphatic hydrocarbon group, and is particularly preferably an alkyl group in order to enhance the photocatalytic performance and dispersibility of the photocatalyst particles. The aliphatic hydrocarbon group may be linear, branched, or cyclic. When the aliphatic hydrocarbon group is linear or branched, the dispersibility of the photocatalyst particles may be enhanced. The number of the carbon atoms contained in the aliphatic hydrocarbon group is preferably 1 to 20, is more preferably 1 to 18, is further preferably 4 to 12, and is particularly preferably 4 to 10.

The organometallic compound may be a silane that has a hydrocarbon group. Examples of the silane that has a hydrocarbon group include chlorosilanes and alkoxysilanes.

The silane that has a hydrocarbon group may be the compound represented by Formula (1) below. In such a case, the photocatalytic performance and dispersibility of the photocatalyst particles may be enhanced.

$$R^1{}_n SiR^2{}_n \tag{1}$$

In Formula (1), $R^1$ represents a saturated or unsaturated aliphatic hydrocarbon group having 1 to 20 carbon atoms or an aromatic hydrocarbon group having 6 to 20 carbon atoms; $R^2$ represents a halogen atom or an alkoxy group; n is an integer of 1 to 3; m is an integer of 1 to 3; and n m=4. When n is an integer of 2 or 3, the plural $R^1$ groups may be identical to or different from one another. When m is an integer of 2 or 3, the plural $R^2$ groups may be identical to or different from one another.

The aliphatic hydrocarbon group represented by $R^1$ may be linear, branched, or cyclic. When the aliphatic hydrocarbon group is linear or branched, the dispersibility of the photocatalyst particles may be enhanced. The number of the carbon atoms contained in the aliphatic hydrocarbon group is preferably 1 to 20, is more preferably 1 to 18, is further preferably 4 to 12, and is most preferably 4 to 10 in order to enhance the photocatalytic performance and dispersibility of the photocatalyst particles. The aliphatic hydrocarbon group may be a saturated aliphatic hydrocarbon group or an unsaturated aliphatic hydrocarbon group. The aliphatic hydrocarbon group is preferably a saturated aliphatic hydrocarbon group and is more preferably an alkyl group in order to enhance the photocatalytic performance and dispersibility of the photocatalyst particles.

Examples of the saturated aliphatic hydrocarbon group include linear alkyl groups, such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group; branched alkyl groups, such as an isopropyl group, an isobutyl group, an isopentyl group, a neopentyl group, a 2-ethylhexyl group, a tert-butyl group, a tert pentyl group, and an isopentadecyl group; and cyclic alkyl groups, such as a cyclopropyl group, a cyclopentyl group, a cyclohexyl group, a cycloheptyl group, a cyclooctyl group, a tricyclodecyl group, a norbornyl group, and an adamantyl group.

Examples of the unsaturated aliphatic hydrocarbon group include alkenyl groups, such as a vinyl group (i.e., an ethenyl group), a 1-propenyl group, a 2-propenyl group, butenyl group, a 1-butenyl group, a 1-hexenyl group, a 2-dodecenyl group, and a pentenyl group; and alkynyl groups, such as an ethynyl group, a 1-propynyl group, a 2-propynyl group, a 1-butynyl group, a 3-hexynyl group, a 2-dodecynyl group.

The aliphatic hydrocarbon group may be a substituted aliphatic hydrocarbon group. Examples of the substituent group included in the substituted aliphatic hydrocarbon group include a halogen atom, an epoxy group, a glycidyl group, a glycidoxy group, a mercapto group, a methacryloyl group, and an acryloyl group.

The number of carbon atoms contained in the aromatic hydrocarbon group represented by R is preferably 6 to 20, is more preferably 6 to 18, is further preferably 6 to 12, and is particularly preferably 6 to 10.

Examples of the aromatic hydrocarbon group include a phenylene group, a biphenylene group, a terphenylene group, a naphthalene group, and an anthracene group.

The aromatic hydrocarbon group may be a substituted aromatic hydrocarbon group. Examples of the substituent group included in the substituted aromatic hydrocarbon group include a halogen atom, an epoxy group, a glycidyl group, a glycidoxy group, a mercapto group, a methacryloyl group, and an acryloyl group.

Examples of the halogen atom represented by $R^2$ include a fluorine atom, a chlorine atom, a bromine atom, and an iodine atom. The halogen atom is preferably a chlorine atom, a bromine atom, or an iodine atom.

Examples of the alkoxy group represented by $R^2$ include an alkoxy group having 1 to 10 carbon atoms, preferably having 1 to 8 carbon atoms, and more preferably having 3 to 8 carbon atoms. Examples of such an alkoxy group include a methoxy group, an ethoxy group, an isopropoxy group, a t-butoxy group, an n-butoxy group, an n-hexyloxy group, a 2-ethylhexyloxy group, and a 3,5,5-trimethylhexyloxy group. The alkoxy group may be a substituted alkoxy group. Examples of the substituent group included in the substituted alkoxy group include a halogen atom, a hydroxyl group, an amino group, an alkoxy group, an amide group, and a carbonyl group.

It is preferable that $R^1$ included in the compound represented by Formula (1) above be a saturated aliphatic hydrocarbon group. In such a case, the photocatalytic performance and dispersibility of the photocatalyst particles may be enhanced. It is particularly preferable that, in the compound represented by Formula (1) above, $R^1$ be a saturated aliphatic hydrocarbon group having 1 to 20 carbon atoms, $R^2$ be a halogen atom or an alkoxy group, n be an integer of 1 to 3, and m be an integer of 1 to 3, where n m=4.

Examples of the compound represented by Formula (1) above include the following:

silanes represented by Formula (1) in which n=1 and m=3, such as vinyltrimethoxysilane, methyltrimethoxysilane, ethyltriethoxysilane, propyltrimethoxysilane, butyltrimethoxysilane, hexyltrimethoxysilane, octyltrimethoxysilane, decyltrimethoxysilane, dodecyltrimethoxysilane, vinyltriethoxysilane, methyltriethoxysilane, ethyltriethoxysilane, butyltrimethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane;

silanes represented by Formula (1) in which n=2 and m=2, such as dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, and dichlorodiphenylsilane;

silanes represented by Formula (1) in which n=3 and m=1, such as trimethylmethoxysilane, trimethylethoxysilane trimethylchlorosilane, decyldimethylchlorosilane, and triphenylchlorosilane; and.

silanes represented by Formula (1) in which $R^1$ is a substituted aliphatic hydrocarbon group or a substituted aromatic hydrocarbon group, such as 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl) aminopropylmethyldimethoxysilane, and γ-glycidyloxypropylmethyldimethoxysilane.

The above silanes may be used alone or in combination of two or more.

The hydrocarbon group contained in the silane represented by Formula (1) above is preferably an aliphatic hydrocarbon group, is more preferably a saturated aliphatic hydrocarbon group, and is particularly preferably an alkyl group in order to enhance the photocatalytic performance and dispersibility of the photocatalyst particles. The hydrocarbon group contained in the silane is preferably a saturated aliphatic hydrocarbon group having 1 to 20 carbon atoms, is more preferably a saturated aliphatic hydrocarbon group having 1 to 18 carbon atoms, is further preferably a saturated aliphatic hydrocarbon group having 4 to 12 carbon atoms, and is particularly preferably a saturated aliphatic hydrocarbon group having 4 to 10 carbon atoms in order to enhance the photocatalytic performance and dispersibility of the photocatalyst particles.

Examples of the organometallic compound that contains an aluminum atom as a metal atom include an alkyl aluminate, such as triethoxyaluminum, tri-i-propoxyaluminum, or tri-sec-butoxyaluminum; an aluminum chelate, such as di-i-propoxy·mono-sec-butoxyaluminum or propoxyaluminum·ethyl acetoacetate; and an aluminate coupling agent, such as acetoalkoxyaluminum diisopropylate.

Examples of the organometallic compound that contains a titanium atom as a metal atom include titanate coupling agents, such as isopropyl triisostearoyl titanate, tetraoctyl bis(ditridecyl phosphite) titanate, and bis(dioctyl pyrophosphate)oxyacetate titanate; and titanium chelates, such as di-i-propoxy bis(ethyl acetoacetate)titanium, di-i-propoxy bis(acetylacetonate)titanium, di-i-propoxy bis(triethanolaminate)titanium, di-i-propoxytitanium diacetate, and di-i-propoxytitanium dipropionate.

The above organometallic compounds may be used alone or in combination of two or more.

Method for Producing Photocatalyst Particles

The method for producing the photocatalyst particles is not limited. The photocatalyst particles may be produced by, for example, treating the surfaces of the untreated particles with the organometallic compound.

An example of the method for producing the photocatalyst particles is described below.

The method for producing the photocatalyst particles may include, for example, (a) a step in which the surfaces of the untreated particles are treated with the organometallic compound, and (b) a step in which the Particles are heated in or after the surface treatment of the untreated particles.

(a) Surface Treatment Step

Examples of the method for treating the surfaces of the untreated particles with the organometallic compound include, but are not limited to, the following: a method in which the organometallic compound is brought into direct contact with the untreated particles; and a method in which a treatment liquid produced by dissolving the organometallic compound in a solvent is brought into contact with the untreated particles. Specific examples of such a surface treatment method include following: a method in which the untreated particles are dispersed in a solvent to form a dispersion liquid and, while the dispersion liquid is stirred, the organometallic compound or the treatment liquid is added to the dispersion liquid; and a method in which, while the untreated particles are fluidized by, for example, being stirred with a HENSCHEL mixer or the like, the organometallic compound or the treatment liquid is added (e.g., by dropping or spraying) to the untreated particles. By any of the above methods, the reactive group (i.e., a hydrolyzable group, such as a halogeno group or an alkoxy group) included in the organometallic compound reacts with hydroxyl groups present on the surfaces of the untreated particles and, as a result, the surfaces of the untreated particles are modified with the organometallic compound.

The surface treatment step may be conducted in an air atmosphere or in a nitrogen atmosphere. In the case where the untreated particles that are to be subjected to the surface treatment are the titanium oxide aerogel particles or the silica-titania composite aerogel particles, the surface treatment step may be conducted in supercritical carbon dioxide. In such a case, the organometallic compound may reach deep into the pores of the porous particles and even portions deep inside the pores of the porous particles may be subjected to the surface treatment.

The surface treatment step may be conducted in supercritical carbon dioxide by, for example, mixing the organometallic compound with the porous body in supercritical carbon dioxide while performing stirring and causing the reaction of the porous body and the organometallic compound. Such a surface treatment step may also be conducted by, for example, mixing the organometallic compound with a solvent and mixing the resulting treatment liquid with the porous body in supercritical carbon dioxide while performing stirring. In order to increase the specific surface area of the porous body while maintaining the porous structure, the organometallic compound may be charged into the supercritical carbon dioxide after the termination of the solvent removal step so as to react with the surface of the porous body in the supercritical carbon dioxide.

Examples of the solvent in which the organometallic compound is dissolved include organic solvents, such as a hydrocarbon solvent, an ester solvent, an ether solvent, a halogenated solvent, and an alcohol solvent), water, and mixed solvents of the above solvents. Examples of the hydrocarbon solvent include toluene, benzene, xylene, hexane, octane, hexadecane, and cyclohexane. Examples of the ester solvent include methyl acetate, ethyl acetate, isopropyl acetate, and amyl acetate. Examples of the ether solvent include dibutyl ether and dibenzyl ether. Examples of the halogenated solvent include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of the alcohol solvent include methanol, ethanol, and -propyl alcohol. Examples of the water include tap water, distilled water, and pure water. Other examples of the solvent include dimethylformamide, dimethylacetamide, dimethyl sulfoxide, acetic acid, and sulfuric acid.

The concertation of the organometallic compound in the treatment liquid, which is prepared by dissolving the organometallic compound in the solvent, is preferably 0.05 mol/L or more and 500 mol/L or less and is more preferably 0.5 mol/L or more and 10 mol/L or less.

In order to enhance the photocatalytic performance and dispersibility of the photocatalyst particles, the surface treatment of the particles with the organometallic compound may be performed under the following conditions. Specifically, the amount of organometallic compound used for treating the surfaces of the untreated particles may be 10% by mass or more and 100% by mass or less, is preferably 20% by mass or more and 75% by mass or less, and is more preferably 25% by mass or more and 50% by mass or less of the amount of untreated particles. When the amount of organometallic compound is 10% by mass or more of the amount of untreated particles, the photocatalytic performance and dispersibility of the photocatalyst particles may be further enhanced even in the wavelength range of visible light. When the amount of organometallic compound is 100% by mass or less of the amount of untreated particles, an excessive increase in the amount of metal present on the surfaces of the particles which is derived from the organometallic compound may be prevented and, consequently, a reduction in the photocatalytic performance which is caused by the excess metal may be limited.

The temperature at which the surfaces of the untreated particles are treated with the organometallic compound is preferably 15° C. or more and 150° C. or less and is more preferably 20° C. or more and 100° C. or less. The amount of time during which the surfaces of the untreated particles are treated with the organometallic compound is preferably 10 minutes or more and 120 minutes or less and is more preferably 30 minutes or more and 90 minutes or less.

In the case where the surface treatment is performed in supercritical carbon dioxide, the surface treatment step is conducted at the temperature and the pressure at which carbon dioxide is brought into a supercritical state. For example, the surface treatment step is conducted in an atmosphere having a temperature of 50° C. or more and 200° C. or less and a pressure of 10 MPa or more and 30 MPa or less. The amount of time during which the reaction is conducted is preferably 10 minutes or more and 24 hours or less, is more preferably 20 minutes or more and 120 minutes or less, and is further preferably 30 minutes or more and 90 minutes or less.

A drying treatment may be performed subsequent to the surface treatment of the untreated particles with the organometallic compound. Examples of the method for performing the drying treatment include, but are not limited to, known drying methods such as vacuum drying and spray drying. The drying temperature may be set to 20° C. or more and 150° C. or less.

In the case of the surface treatment in supercritical carbon dioxide, a step of removing the solvent from the dispersion containing porous particles by using supercritical carbon dioxide is preferred, and a step of removing the solvent by circulating supercritical carbon dioxide in the dispersion after completion of the surface treatment step is more preferred.

(b) Heat Treatment Step

The heat treatment is performed in the step in which the untreated particles are subjected to the surface treatment or subsequent to the step in which the untreated particles are subjected to the surface treatment.

The heat treatment may be performed when the untreated particles are subjected to the surface treatment using the organometallic compound; when the drying treatment is performed subsequent to the surface treatment; or independently after the drying treatment. In order to allow the particles to react with the organometallic compound to a sufficient degree before the heat treatment, it is preferable to perform the heat treatment when the drying treatment is performed subsequent to the surface treatment or independently after the drying treatment. In order to perform the drying treatment appropriately, it is more preferable to perform the heat treatment independently after the drying treatment.

The temperature at which the heat treatment is performed is preferably 180° C. or more and 500° C. or less, is more preferably 200° C. or more and 450° C. or less, and is further Preferably 250° C. or more and: 400° C. or less in order to enhance the photocatalytic performance and dispersibility of the photocatalyst particles. The amount of time during which the heat treatment is performed is preferably 10 minutes or more and 300 minutes or less and is more preferably 30 minutes or more and 120 minutes or less in order to enhance the photocatalytic performance and dispersibility of the photocatalyst particles. In the case where the heat treatment is performed within the step in which the untreated particles are subjected to the surface treatment, the reaction of the particles and the organometallic compound may be conducted to a sufficient degree at the above-described surface treatment temperature before the heat treatment is performed at the above-described heat treatment temperature. In the case where the heat treatment is performed within the drying treatment subsequent to the surface treatment, the drying treatment is performed at the heat treatment temperature.

When the heat treatment temperature is set to 180° C. or more and 500° C. or less, the photocatalyst particles having high photocatalytic performance even in the wavelength range of visible light may be produced efficiently. It is considered that, when the heat treatment is performed at 180° C. or more and 500° C. or less, the hydrocarbon groups present on the surface of the particle, which are derived from the metal compound, become oxidized to an appropriate degree and, consequently, some C—C linkages and some C=C linkages are converted to C—O linkages and C=O linkages, respectively.

The heat treatment may be performed in an atmosphere having an oxygen concentration of 1% or more and 21% or less by volume. When the heat treatment is performed in such an oxygen atmosphere, the hydrocarbon groups present on the surface of the particle, which are derived from the metal compound, may become oxidized to an appropriate degree with efficiency. The oxygen concentration in the oxygen atmosphere is more preferably 3% or more and 21% or less by volume and is further preferably 5% or more and 21% or less by volume.

The method for performing the heat treatment is not limited; for example, the following publicly known heating methods may be used: heating with an electric furnace, a baking furnace (e.g., a roller hearth kiln or a shuttle kiln), or a radiation heating furnace; and heating using a laser beam, infrared radiation, UV radiation, or a microwave.

The photocatalyst particles are produced by the above-described steps.

Properties of Photocatalyst Particle

The photocatalyst particle has absorption at wavelengths of 450 nm and 750 nm in the visible absorption spectrum of the photocatalyst particle.

The photocatalyst particle preferably has absorption at wavelengths of 450 nm, 600 nm, and 750 nm in the visible absorption spectrum, more preferably have absorption over the entire wavelength range of 450 nm or more and 750 nm or less in the visible absorption spectrum, and particularly preferably have absorption over the entire wavelength range of 400 nm or more and 800 nm or less in the visible absorption spectrum in order to produce high photocatalytic performance even in the wavelength range of visible light.

In order to produce high photocatalytic performance even in the wavelength range of visible light, the photocatalyst particle may have an absorbance of 0.02 or more, preferably have an absorbance of 0.1 or more, more preferably have an absorbance of 0.2 or more, and further preferably have an absorbance of 0.3 or more at a wavelength of 450 nm; the photocatalyst particle may have an absorbance of 0.02 or more, preferably have an absorbance of 0.1 or more, and more preferably have an absorbance of 0.2 or more, at a wavelength of 600 nm; and the photocatalyst particle may have an absorbance of 0.02 or more, preferably have an absorbance of 0.05 or more, and more preferably have an absorbance of 0.1 or more, at a wavelength of 750 nm, in the ultraviolet-visible absorption spectrum of the photocatalyst particle, with the absorbance of the photocatalyst particle at a wavelength of 350 nm being 1.

The ultraviolet-visible absorption spectrum of the photocatalyst particle may be determined by the following method. The photocatalyst particles that are to be measured are dispersed in tetrahydrofuran. The resulting dispersion liquid is applied onto a glass substrate and dried at 24° C. in an air atmosphere. The diffuse reflectance spectrum of the particles in a wavelength range of 200 to 900 nm is measured using, for example, a spectrophotometer "U-4100" produced by Hitachi High-Technologies Corporation with a scanning speed of 600 nm, a slit width of 2 nm, and a sampling interval of 1 nm at a position of diffuse reflection. The absorbances of the particle at the specific wavelengths are theoretically determined from the diffuse reflectance spectrum by Kubelka-Munk transformation. Hereby, the ultraviolet-visible absorption spectrum of the photocatalyst particle is obtained.

The photocatalyst particle may have an absorption peak in a wavenumber range of 2700 $cm^{-1}$ or more and 3000 $cm^{-1}$ or less in the infrared absorption spectrum of the photocatalyst particle.

Specifically, for example, the photocatalyst particle may have at least one absorption peak in a wavenumber range of 2700 $cm^{-1}$ or more and 3000 $cm^{-1}$ or less in the infrared absorption spectrum. The expression have an absorption peak used herein means having absorption with an absorption intensity (i.e., an absorbance) of 0.022 (a transmittance of 5%) or more.

The infrared absorption spectrum of the photocatalyst particle may be determined by the following method. First, the titanium oxide particles that are to be measured are formed into a test sample by the KBr pellet method. The test sample is subjected to an infrared spectrophotometer "FT-IR-410" produced by JASCO Corporation with a number of scans of 300 and a resolution of 4 $cm^{-1}$ in a wavenumber range of 500 $cm^{-1}$ or more and 4000 $cm^{-1}$ or less. Hereby, the infrared absorption spectrum of the photocatalyst particle is obtained.

The average size of the photocatalyst particles is preferably 0.01 μm or more and 0.5 μm or less, is more preferably 0.02 μm or more and 0.15 μm or less, and is further preferably 0.02 μm or more and 0.1 μm or less. When the average size of the photocatalyst particles is 0.01 μm or more, the aggregation of the particles is reduced and, consequently, the photocatalytic performance of the photocatalyst particles is likely to be enhanced. When the average size of the photocatalyst particles is 0.5 μm or less, the proportion of the specific surface area of the photocatalyst particles to the amount of the photocatalyst particles is large and, consequently, the photocatalytic performance of the photocatalyst particles is likely to be enhanced. Accordingly, setting the average size of the photocatalyst particles to fall within the above range increases the likelihood of the photocatalyst particles producing high photocatalytic performance in the wavelength range of visible light.

Note that, in the case where the photocatalyst particles are aerogel particles, the term "the average size of the photocatalyst particles" used herein refers to the average size of the primary particles constituting the aerogel particles.

The ratio of the average size of the photocatalyst particles to the average pore size of the filter medium (average particle size/average pore size) is preferably $0.002 \times 10^{-3}$ or more and $0.5 \times 10^{-3}$ or less, is more preferably $0.002 \times 10^{-3}$ or more and $0.067 \times 10^{-3}$ or less, and is further preferably $0.002 \times 10^{-3}$ or more and $0.034 \times 10^{-3}$ or less in order to enhance the deodorizing power of the filter. The above ratio may be set to $0.004 \times 10^{-3}$ or more and $0.15 \times 10^{-3}$ or less, The average size of the photocatalyst particles is the average size of primary particles (average primary particle size), which is determined by the following method.

While the photocatalyst particles are deposited (i.e., adhered) on the filter medium, an image of the photocatalyst particles is taken with a scanning electron microscope "S-4100" produced by Hitachi, Ltd. When the image is taken, the magnifying power of the scanning electron microscope is adjusted such that plural primary particles can be identified by image analysis. The image is captured into an image processor "LUZEXIII" produced by NIRECO CORPORATION. The area of each of the primary particles is determined by the image analysis of the primary particle, and the equivalent circle diameter (μm) of the primary particle is calculated from the area of the primary particle. The average of the equivalent circle diameters of the primary particles is calculated as an average primary particle size (μm). The average primary particle size is determined by analyzing about 10 to 50 primary particles.

In the case where the photocatalyst particle is the silica-titania composite aerogel particle, the photocatalyst particle may be produced by treating, with the organometallic compound, the surfaces of untreated silica-titania composite aerogel particles each of which includes a titania layer as a surface layer.

Specifically, the particle contains a base particle (e.g., the element ratio of silicon to titanium (Si/Ti) contained in the base particle is more than 0 and 6 or less), a titania layer present on the surface of the base particle (hereinafter, referred to as "intermediate layer"), and a layer formed on the surface of the titania layer by the metal compound that contains a metal atom and a hydrocarbon group binding to the surface of the titania layer with an oxygen atom (i.e., a layer containing the metal compound that contains a metal atom and a hydrocarbon group; hereinafter, referred to as "surface layer").

Whether the silica-titania composite aerogel particle has the above layer may be determined by the following method. The following method may also be used for determining whether particle other than the silica-titania composite aerogel particle has the surface layer.

The silica-titania composite aerogel particle is subjected to a qualitative analysis (wide scan analysis) by XPS while the surface of the silica-titania composite aerogel particle is etched using noble gas ions in the depth direction in order to identify and measure at least titanium, silicon, and carbon. On the basis of the data obtained from the analysis, an element profile for each of the elements, that is, at least titanium, silicon, and carbon, is drawn with the vertical axis representing peak intensity and the horizontal axis representing etching time. The profile curves are divided into plural regions in accordance with the inflection points in order to identify a region reflective of the element composition of the base particles, a region reflective of the element composition of the intermediate layer, and a region reflective of the element composition of the surface layer. It is considered that the silica-titania composite aerogel particle contains the intermediate layer when the region reflective of the element composition of the intermediate layer is present on the element profiles. It is considered that the silica-titanic composite aerogel particle contains the surface layer when the region reflective of the element composition of the surface layer is present on the element profiles, Further description is made with reference to FIG. 5.

Figure 5:
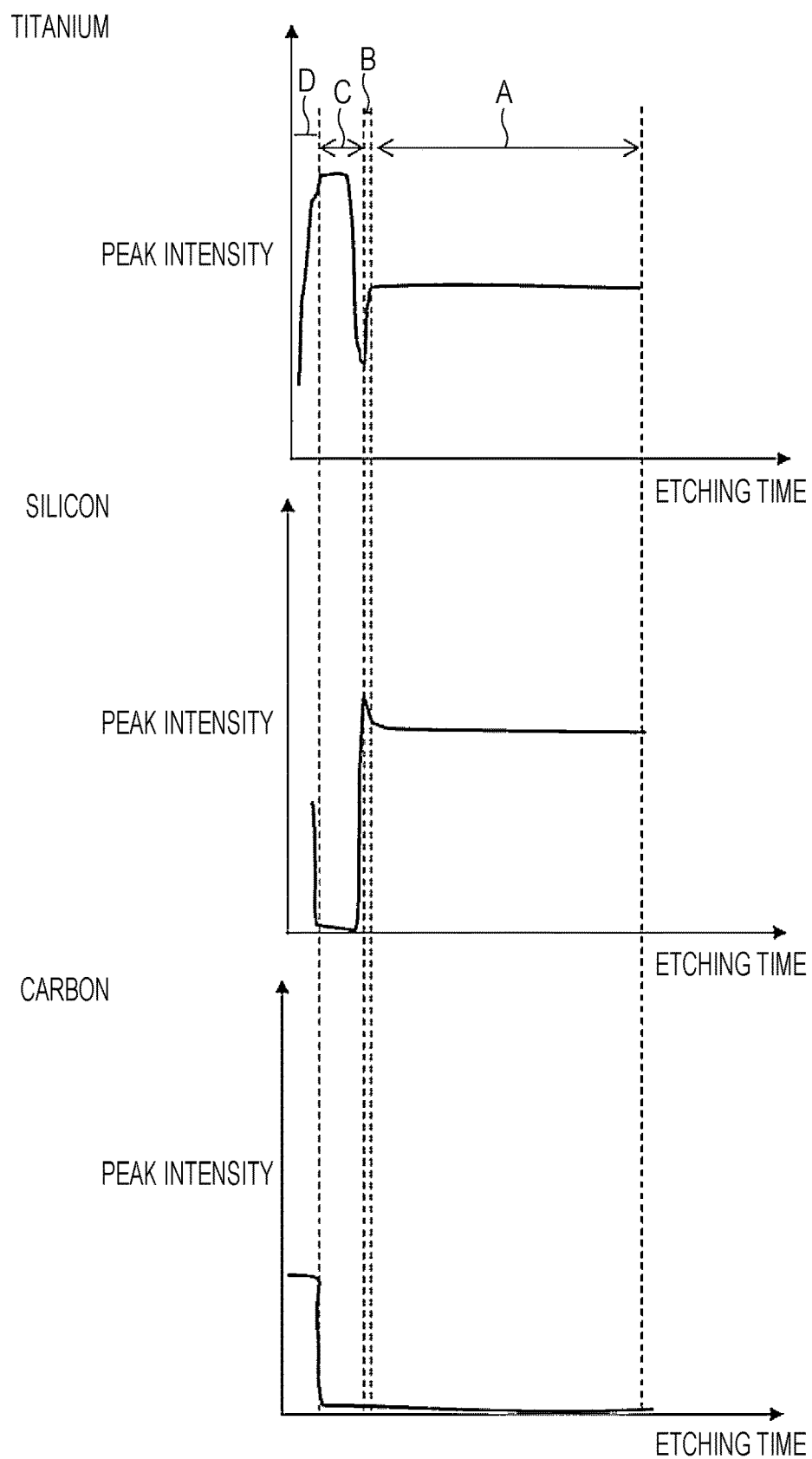
FIG. 5 is a diagram illustrating examples of element profiles of silica-titania composite particles, which are element profiles for titanium, silicon, and carbon in order from the top.

FIG. 5 illustrates an example of element profiles of the silica-titania composite aerogel particle. FIG. 5 includes element profiles for titanium, silicon, and carbon in order from the too.

The element profiles illustrated in FIG. 5 are divided into the following regions A, B, C, and D in accordance with the inflection points of the profile curves.

Region A: A region observed in the final stage of etching, in which the peak intensities for titanium and silicon substantially do not change.

Region B: A region observed immediately before the region. A, in which the peak intensity for titanium decreases and the peak intensity for silicon increases in the direction toward particle surface.

Region C: A region observed immediately before the region B, in which the peak intensity for titanium substantially does not change and silicon is hardly detected.

Region D: A region observed in the earliest stage of etching, in which the peak intensity for carbon substantially does not change and a metal element is detected.

The regions A and B reflect the element composition of the base particle. In the production of the base particle, silica and titania form a covalent bond at a specific ratio appropriate to the mixing ratio between alkoxysilane and titanium alkoxide, which are raw materials for silica-titania composite, to form the base particle. Silica is more likely to appear on the surface of the base particle than titania. As a result, the region A, in which the peak intensities for titanium and silicon substantially do not change, is observed in the final stage of etching, and the region B, in which the peak intensity for titanium decreases and the peak intensity for silicon increases in the direction toward particle surface, is observed immediately before the region A.

The region C reflects the element composition of the intermediate layer. In the case where the region C, in which the peak intensity for titanium substantially does not change and silicon is hardly detected, is observed immediately before the region B, it is considered that the silica-titania composite aerogel particle contains the intermediate layer that is a "titania layer".

Although the region C reflects the element composition of the intermediate layer, the region C does not always correspond to the intermediate layer exactly. A portion of the region C which is close to the region B may reflect the element composition of the base particle.

The region D reflects the element composition of the surface layer. In the case where the region D, in which the peak intensity for carbon substantially does not change and a metal element is detected, is observed in the earliest stage of etching, it is considered that the silica-titania composite aerogel particle contains a surface layer that is "a layer containing the metal compound containing a metal atom and a hydrocarbon group".

Examples of the metal atom constituting the metal compound contained in the surface layer include silicon, aluminum, and titanium. Therefore, identification and measurement of aluminum may optionally be conducted by XPS and the element profile for aluminum may be drawn.

Although the region D reflects the element composition of the surface layer, the region D does not always correspond to the surface layer exactly. A portion of the region D which is close to the region C may reflect the element composition of the intermediate layer.

The element profiles illustrated in FIG. 5 confirm that the photocatalyst particle is a silica-titania composite aerogel particle that contains the base particle, the intermediate layer, and the surface layer and that the metal atom constituting the metal compound contained in the surface layer is a silicon atom.

Properties of Filter

The air permeability of the filter according to this exemplary embodiment is preferably 1 $cm^3/cm^2 \cdot sec$ or more and 300 $cm^3/cm^2 \cdot sec$ or less and is more preferably 5 $cm^3/cm^2 \cdot sec$ or more and 200 $cm^3/cm^2 \cdot sec$ or less in order to enhance the performance of the filter.

The air permeability of the filter may be measured by the following method.

The air permeability of the filter is measured with a Frazier type air permeability tester "AP-360SM" produced by DAIEI KAGAKU SEIKI MFG. CO., LTD. Specifically, a specimen having a size of about 20 cm×20 cm is attached to an end of the cylinder of the Frazier type air permeability tester. Subsequently, the section fan is adjusted using the rheostat such that the inclined barometer indicates a pressure of 125 Pa (1.27 $cmH_2O$). The amount ($cm^3/cm^2/s$) of air that passes through the specimen is determined from the pressure indicated by the vertical barometer and the type of the air hole used with reference to the table provided with the tester. The measurement of r permeability is conducted five times, and the average thereof is used as the air permeability of the filter.

The filter according to this exemplary embodiment may be transmissible to visible light. In such a case, the catalytic performance of the photocatalyst. Particles, which are capable of producing high photocatalytic performance in the wavelength range of visible light, may be achieved with efficiency.

Specifically, the transmittance of visible light through the filter is preferably 10% or more, is more preferably 10% or more and 70% or less, is further preferably 30% or more and 70% or less, and is particularly preferably 50% or more and 70% or less.

The transmittance of visible light through the filter may be measured by the following method.

The total luminous transmittance (%) of the filter is measured in accordance with JIS K7361-1:1997 with a haze meter "NDH-2000" produced by Nippon Denshoku Industries Co., Ltd.

The filter according to this exemplary embodiment may have the property of scattering light inside the filter. When the filter has the light-scattering property, the catalytic performance of the photocatalyst particles, which are capable of producing high photocatalytic performance in the wavelength range of visible light, may be achieved with efficiency as a result of scattering of visible light.

Specifically, the optical reflectance of the filter medium is preferably 10% or more and 90% or less, is more preferably 20% or more and 80% or less, and is further preferably 256 or more and 75% or less.

The optical reflectance of the filter medium may be measured by the following method.

The diffuse reflectance spectrum of a specimen taken from the material constituting the filter medium in a wavelength range of 200 to 900 nm is measured using, for example, a spectrophotometer "U-4100" produced by Hitachi High-Technologies Corporation with a scanning speed of 600 nm, a slit width of 2 nm, and a sampling interval of 1 nm at a position of diffuse reflection. The optical reflectance of the filter medium is determined from the diffuse reflectance spectrum.

The filter according to this exemplary embodiment may have high lightness. When the filter has high lightness, the catalytic performance of the photocatalyst particles, which are capable of producing high photocatalytic performance in the wavelength range of visible light, may be achieved with efficiency as a result of reflection of visible light.

Specifically, the L* value of the filter medium in the CIE 1976 L*a*b* colorimetric system may be 35% or more and 90% or less.

In the filter according to this exemplary embodiment, the amount of the photocatalyst particles deposited on the filter medium is preferably 3% or more and 30% or less, is more preferably 8% or more and 25% or less, and is further preferably 10% or more and 20% or less in order to enhance the deodorizing power of the filter.

The amount of the photocatalyst particles deposited on the filter medium may be measured by the following method.

The amount of the photocatalyst particles deposited on the filter medium is determined by measuring the weight of the filter medium before and after the deposition of the photocatalyst particles and substituting the weights of the filter medium in the following formula.

Amount of photocatalyst deposited on filter medium (%)=[(Weight of filter medium after deposition−Weight of filter medium before deposition)/Weight of filter medium after deposition]×100

In the filter according to this exemplary embodiment, the ratio at which the photocatalyst particles become eliminated from the filter medium is preferably 1% or more and 50% or less, is more preferably 3% or more and 40% or less, and is further preferably 5% or more and 30% or less in order to reduce the likelihood of the photocatalyst particles becoming detached from the filter on impact or the like.

Setting the elimination ratio of the photocatalyst particles to be 1% or more may limit the degradation of the photocatalytic effect of the photocatalyst particles, that is, the degradation of the deodorizing power of the filter, which occurs when the photocatalyst particles are excessively buried in the side surfaces of the pores of the filter medium.

Setting the elimination ratio of the photocatalyst particles to be 50% or less may reduce the detachment of the photocatalyst particles from the filter medium.

The elimination ratio of the photocatalyst particles may be adjusted by changing the size of the photocatalyst particles and the conditions under which the photocatalyst particles are deposited (i.e., adhered) on the filter medium.

The ratio at which the photocatalyst particles become eliminated from the filter medium may be determined by the following method.

The filter medium on which the photocatalyst particles are deposited, that is, the filter, is immersed in 40300 ml of a 0.2% aqueous solution of a surfactant that is polyoxyethylene octylphenyl ether produced by Wako Pure Chemical industries, Ltd. While the filter medium is immersed in the aqueous solution, ultrasonic vibration (power: 20 W, frequency: 20 kHz) is applied to the solution for 1 minute in order to cause the photocatalyst particles to become eliminated from the surface of the filter medium. After a supernatant of the dispersion liquid which is other than the filter medium has been removed, pure water is added to the residue, which is then filtered and dried. Hereby, a filter medium from which some of the photocatalyst particles have been eliminated is prepared.

The amount of "the atoms constituting the photocatalyst particles (e.g., titanium atoms)" deposited on the filter medium before the application of the ultrasonic vibration and the amount of "the atoms constituting the photocatalyst particles (e.g., titanium atoms)" contained in the filter medium from which some of the photocatalyst particles have been eliminated by the application of the ultrasonic vibration are measured by fluorescent X-ray analysis. The ratio at which the photocatalyst particles become eliminated from the filter medium is calculated using the following formula.

Ratio at which photocatalyst particles become eliminated from filter medium (%)=((amount of "atoms constituting photocatalyst particles (e.g., titanium atoms)" contained in filter medium before application of ultrasonic vibration)−(amount of "atoms constituting photocatalyst particles (e.g., titanium atoms)" contained in filter medium after application of ultrasonic vibration))/(amount of "atoms constituting photocatalyst particles (e.g., titanium atoms)" contained in filter medium before application of ultrasonic vibration)×100

Method for Producing Filter

The method for producing the filter according to this exemplary embodiment is not limited. For example, a method in which a dispersion liquid that contains the photocatalyst Particles dispersed therein is applied to the filter medium and the resulting coating film is dried in order to deposit the photocatalyst particles on the filter medium may be used. Since the above-described photocatalyst particles that contain the specific titanium compound particles have an adhesive surface, the photocatalyst particles are capable of fixedly adhering directly onto the side surfaces of the pores of the filter medium.

For applying the dispersion liquid to the filter medium, known coating methods, such as dip coating and spray coating, may be used.

Examples of the dispersion medium used for preparing the dispersion liquid include water and volatile dispersion media, such as alcohols.

Alternatively, a method in which a binder is used for depositing the photocatalyst particles on the filter medium may be used.

Examples

The exemplary embodiment of the present disclosure is described in detail with reference to Examples below. It is not intended that the exemplary embodiment of the present disclosure be limited to the specific examples below in the following description, the unit "part" is on a mass basis unless otherwise specified.

Preparation of Photocatalyst Particles

Metatitanic Acid Particles MTA1

An anatase seed prepared separately is added to a titanyl sulfate solution having a $TiO_2$ concentration of 260 g/L and a $Ti^{3+}$ concentration of 6.0 g/L as $TiO_2$ in an amount that is 8% by mass as $TiO_2$ of the amount of $TiO_2$ contained in the titanyl sulfate solution. The resulting solution is heated at a temperature equal to or higher than the boiling point to hydrolyze titanyl sulfate ($TiOSO_4$). Hereby, particulate metatitanic acid is formed. The metatitanic acid particles are filtered, cleaned, and then formed into a slurry. After the pH of the slurry has been adjusted to be 7, the slurry is cleaned. Hereby, a metatitanic acid slurry having an average particle size of 0.042 μm is prepared.

While the metatitanic acid slurry having an average particle size of 0.042 μm is stirred, a 5 N aqueous sodium hydroxide solution is added to the metatitanic acid slurry in order to adjust the pH of the metatitanic acid slurry to be 8.5. After the metatitanic acid slurry has been stirred for 2 hours, 6 N hydrochloric acid is added to the metatitanic acid slurry in order to adjust the pH of the metatitanic acid slurry to be 5.8. Then, the slurry is filtered, and the residue is cleaned with water. Subsequent to the cleaning, water is added to the residue to form a slurry again. While the slurry is stirred, 6 N hydrochloric acid is added to the slurry in order to adjust the pH of the slurry to be 1.3. The stirring is continued for 3 hours. Subsequently, 100 parts by mass of metatitanic acid is fractionated from the slurry. While the metatitanic acid is heated and held at 60° C. and stirred, 30 parts by mass of hexyltrimethoxysilane is added to the metatitanic acid. The resulting mixture is stirred for 30 minutes. A 7 N aqueous sodium hydroxide solution is added to the mixture in order to adjust the pH of the mixture to be 7. Subsequently, the mixture is filtered, and the residue is cleaned with water. The filter residue that has been cleaned with water is spray-dried with a flash dryer at an outlet temperature of 150° C. Hereby, a dry powder is prepared. The dry powder is heated in an electric furnace in which the oxygen concentration is set to 12% by volume at 230° C. for 90 minutes to form metatitanic acid particles MTA1.

Metatitanic Acid Particles MTA2

Metatitanic acid particles MTA2 having an average size of 0.095 μm are prepared as in the preparation of the metatitanic acid particles MTA1, except that the amount of the anatase seed used is changed to 6% by mass.

Metatitanic Acid Particles MTA3

Metatitanic acid particles MTA3 having an average size of 0.150 μm are prepared as in the preparation of the metatitanic acid particles MTA1, except that the amount of the anatase seed used is changed to 4% by mass.

Titanium Oxide Particles TO1

To a dispersion liquid prepared by dispersing commercial anatase titanium oxide particles "SSP-25" produced by Sakai Chemical Industry Co., Ltd. (average size: 0.010 μm) in methanol, hexyltrimethoxysilane is added dropwise in an amount that is 35% by mass of the amount of the untreated titanium oxide particles. After the reaction has been conducted at 40° C. for 1 hour, spray drying is performed with an outlet temperature of 120° C. The resulting dry powder is heated at 290° C. for 1 hour in an electric furnace in which the oxygen concentration is set to 18% by volume. Hereby, titanium oxide particles TO1 are prepared.

Titanium Oxide Particles TO2

To a dispersion liquid prepared by dispersing commercial anatase titanium oxide particles "ST-21" produced by ISHIHARA SANGYO KAISHA, LTD. (average size: 0.020 μm) in methanol, octyltrimethoxysilane is added dropwise in an amount that is 30% by mass of the amount of the untreated titanium oxide particles. After the reaction has been conducted at 40° C. for 1 hour, spray drying is performed with an outlet temperature of 120° C. The resulting dry powder is heated at 270° C. for 1 hour in an electric furnace in which the oxygen concentration is set to 20% by volume. Hereby, titanium oxide particles TO2 are prepared.

Titanium Oxide Particles TO3

To a dispersion liquid prepared by dispersing anatase titanium oxide particles prepared by a sol-gel process (average size: 0.450 μm) in methanol, hexyltrimethoxysilane is added dropwise in an amount that 25% by mass of the amount of the untreated titanium oxide particles. After the reaction has been conducted at 40° C. for 1 hour, spray drying is performed with an outlet temperature of 120° C. The resulting dry powder is heated at 300° C. for 1 hour in an electric furnace in which the oxygen concentration is set to 18% by volume. Hereby, titanium oxide particles TO3 are prepared.

Titanium Oxide Aerogel Particles TOAG1

Into a reaction container, 115.4 parts of methanol and 14.3 parts of tetrabutoxy titanium are charged and mixed with each other. While the resulting liquid mixture is stirred with a magnetic stirrer at 100 rpm, 7.5 parts of a 0.009 mass % aqueous oxalic acid solution is added dropwise to the liquid mixture over 30 seconds. Subsequently, the liquid mixture is held for 30 minutes while being stirred Hereby, 137.3 parts (solid component: 3.4 parts, liquid phase: 133.9 parts) of a dispersion liquid (1) is prepared.

Subsequently, 137.3 parts of the dispersion liquid (1) is charged into a reaction tank. While the dispersion liquid (1) is stirred at 85 rpm, $CO_2$ is charged into the reaction tank, and the temperature and pressure inside the reaction tank are increased to 150° C. and 20 MPa. While the stirring of the dispersion liquid (1) is continued, $CO_2$ is charged into and discharged from the reaction tank for 60 minutes in order to remove 133 parts of the liquid phase.

To the solid phase that remains after the removal of the liquid phase, a mixture of 3.4 parts of isobutyltrimethoxysilane and 3.4 parts of methanol is added over 5 minutes.

While the resulting mixture is stirred at 85 rpm, the mixture is held at 150° C. and 20 MPa for 30 minutes. While the stirring of the mixture is continued, $CO_2$ is charged into and discharged from the reaction tank for 30 minutes in order to remove 6.5 parts of the liquid phase. After the pressure has been reduced to the atmospheric pressure over 30 minutes, 4.6 parts of a power is recovered.

Into an SUS container, 4.0 parts of the powder is charged. The powder is heated at 315° C. for 60 minutes in an electric furnace in which the oxygen concentration is set to 20% by volume. Subsequently, air cooling is performed until the temperature reaches 30° C. The resulting powder is passed through a vibrating sieve having an opening of 45 μm to remove coarse particles. Hereby, 3.5 parts of a powder of titanium oxide aerogel particles TOAG1 is recovered.

Silica-Titania Composite Aerogel Particles STAG1

Into a reaction container, 115.4 parts of methanol and 7.2 parts of tetramethoxysilane are charged and mixed with each other. Into the reaction container, 7.2 parts of tetrabutoxy titanium is further charged and mixed. While the resulting liquid mixture is stirred with a magnetic stirrer at 100 rpm, 7.5 parts of a 0.009 mass % aqueous oxalic acid solution is added dropwise to the liquid mixture over 30 seconds. While the stirring of the liquid mixture is continued, the liquid mixture is held for 30 minutes. Hereby, 137.2 parts (solid component: 4.5 parts, liquid phase: 132.7 parts) of a first dispersion liquid (I-1) is prepared.

Into a reaction container, 137.2 parts of the first dispersion liquid (I-1) is charged. While the first dispersion liquid (I-1) is stirred at 85 rpm, $CO_2$ is charged into the reaction tank, and the temperature and pressure inside the reaction tank are increased to 150° C. and 20 MPa. While the stirring of the dispersion liquid (I-1) is continued, $CO_2$ is charged into and discharged from the reaction tank for 60 minutes in order to remove 132.0 parts of the liquid phase.

To the solid phase that remains after the removal of the liquid phase, a mixture of 4.5 parts of isobutyltrimethoxysilane and 4.5 parts of methanol is added over 5 minutes. While the resulting mixture is stirred at 85 rpm, the mixture is held at 150° C. and 20 MPa for 30 minutes. While the stirring of the mixture is continued, $CO_2$ is charged into and discharged from the reaction tank for 30 minutes in order to remove 8.2 parts of the liquid phase. After the pressure has been reduced to the atmospheric pressure over 30 minutes, 6.0 parts of a power is recovered.

Into an SUS container, 4.0 parts of the powder is charged, and the SUS container is placed on a hot plate. The temperature is increased to 380° C. and held for 60 minutes. Subsequently, air cooling is performed until the temperature reaches 30° C. The resulting powder is passed through a vibrating sieve having an opening of 45 μm to remove coarse particles. Hereby, 3.5 parts of a powder of silica-titanic composite aerogel particles STAG1 is recovered.

The silica-titanic composite aerogel particles STAG1 are particles each of which contains a base particle in which the element ratio of silicon to titanium (Si/Ti) is 3.1 and a surface layer present on the surface of the base particle, the surface layer having an isobutylsilyl group.

Silica-Titania Composite Aerogel Particles STAG2

Into a reaction container, 115.4 parts of methanol and 7.2 parts of tetramethoxysilane are charged and mixed with each other. Into the reaction container, 7.2 parts of tetrabutoxy titanium is further charged and mixed. While the resulting liquid mixture is stirred with a magnetic stirrer at 100 rpm, 7.5 parts of a 0.009 mass % aqueous oxalic acid solution is added dropwise to the liquid mixture over 30 seconds. While the stirring of the liquid mixture is continued, the liquid mixture is held for 30 minutes. Hereby, 137.2 parts (solid component: 4.5 parts, liquid phase: 132.7 parts) of a first dispersion liquid (I-1) is prepared.

Into a reaction container, 137.2 parts of the first dispersion liquid (I-1) is charged. While stirring is performed with a magnetic stirrer at 100 rpm, a liquid mixture of 1.5 parts of tetrabutoxy titanium and 4.5 parts of butanol is added dropwise to the reaction container over 10 minutes. While the stirring of the liquid mixture is continued, the liquid mixture is held for 30 minutes. Hereby, 143.2 parts (solid component: 5.0 parts, liquid phase: 138.2 parts) of a second dispersion liquid (II-1) is prepared.

Into a reaction tank, 143.2 parts of the second dispersion liquid (II-1) is charged. While the second dispersion liquid (II-1) is stirred at 85 rpm, $CO_2$ is charged into the reaction tank, and the temperature and pressure inside the reaction tank are increased to 150° C. and 20 MPa. While the stirring of the dispersion liquid (II-1) is continued, $CO_2$ is charged into and discharged from the reaction tank for 60 minutes in order to remove 138 parts of the liquid phase.

To the solid phase that remains after the removal of the liquid phase, a mixture of 4.5 parts of isobutyltrimethoxysilane and 4.5 parts of methanol is added over 5 minutes. While the resulting mixture is stirred at 85 rpm, the mixture is held at 150° C. and 20 NPa for 30 minutes. While the stirring of the mixture is continued, $CO_2$ is charged into and discharged from the reaction tank for 30 minutes in order to remove 7.0 parts of the liquid phase. After the pressure has been reduced to the atmospheric pressure over 30 minutes, 7.2 parts of a power is recovered.

Into an SUS container, 4.0 parts of the powder is charged, and the SUS container is placed on a hot plate. The temperature is increased to 450° C. and held for 60 minutes. Subsequently, air cooling is performed until the temperature reaches 30° C. The resulting powder is passed through a vibrating sieve having an opening of 45 μm to remove coarse particles. Hereby, 3.5 parts of a powder of silica-titania composite aerogel particles STAG2 is recovered.

The silica-titania composite aerogel particles STAG2 are particles each of which contains a base particle in which the element ratio of silicon to titanium (Si/Ti) is 3.1, a titania layer an intermediate layer) present on the surface of the base particle, and a surface layer present on the surface of the titania layer, the surface layer having an isobutylsilyl group.

The following properties of each of the photocatalyst particle samples prepared in Examples above are measured by the above-described methods. Table 1 summarizes the properties of each of the photocatalyst particle samples.

Visible absorption spectrum properties (in Table 1, denoted as "Visi properties": the absorbances at wavelengths of 450 nm, 600 nm, and 750 nm, with the absorbance at a wavelength of 350 nm being 1)

Infrared absorption spectrum properties (in Table 1, denoted as "IR properties": the presence or absence of absorption peak that occurs in a wavenumber range of 2700 $cm^{-1}$ or more and 3000 $cm^{-1}$ or less, and the wavenumber at which the absorption peak occurs)

Average particle size (in Table 1, denoted as "Particle average size DC")

Preparation of Filters FT1 to FT12

The following filter media (size: 55 mm long×55 mm wide×10 mm thick) are prepared.

Filter medium F1: "Si/SiC Ceramic Filter #8" produced by Nippon Pillar Packing co., Ltd., a filter made of a ceramic porous body, average pore size: 2.8 mm Filter medium F2: "Si/SiC Ceramic Filter #13" produced by Nippon Pillar Packing co., Ltd., a filter made of a ceramic porous body, average pore size: 1.72 mm Filter medium F3: "Si/SiC Ceramic Filter #20" produced by Nippon Pillar Packing co., Ltd., a filter made of a ceramic porous body, average pore size: 1.12 mm In Table 2, the average pore sizes of the filter media are denoted as "Pore size PS".

For each of the filters, a dispersion liquid is prepared by dispersing 2 parts of the specific one of the photocatalyst particle samples described in Table 2 in 100 parts of ethanol.

The dispersion liquid is applied to the specific one of the filter media described in Table 2 by spraying. The resulting coating film is dried. Hereby, the photocatalyst particles are deposited on the filter medium. The amount of the dispersion liquid applied to the filter medium is adjusted such that the amount of photocatalyst particles deposited on the filter medium Is the specific amount described in Table 2.

The filters FT1 to FT12 are prepared in the above-described manner.

Preparation of Comparative Filters

Comparative Filters CFT1 and CFT2

Comparative filters CFT1 and CFT2 are prepared as in the preparation of the filter FT1, except that the comparative filter media CF1 and CF2 described below (size: 55 mm long×55 mm wide×10 mm thick) are used instead, respectively.

Comparative filter medium CF1: a ceramic honeycomb filter "AZPW-45" produced by ASUZAC Inc., average pore size: 650 μm Comparative filter medium CF2: "ceramic honeycomb filter" produced by JapanCeramics inc., average pore size: 6 mm Comparative Filter CFT3

A photocatalyst-deposited ceramic filter "photocatalyst ceramic filter" produced by Nippon. Pillar Packing co., Ltd. (average pore size: 1.12 mm) is used as a comparative filter CFT3.

Evaluations

Evaluation of Properties

The following properties of each of the filters prepared above are determined by the above-described methods.

Air permeability of filter ($cm^3/cm^2 \cdot sec$)

Transmittance of visible light through filter (%)

Optical reflectance of filter medium (%)

$L^*$ value of filter medium in CIE 1976 $L^*a^*b^*$ colorimetric system.

Ratio at which photocatalyst particles become eliminated from filter medium. (%)

Evaluation of Deodorizing Power

The deodorizing power of each of the filters is determined by the following method.

A visible-light photocatalytic air cleaning apparatus is prepared by replacing the ultraviolet-emitting LEDs (upper: 3 near-ultraviolet LEDs (wavelength: 365 nm) lower: 1 deep-ultraviolet LED (wavelength: 275 nm)) included in a commercial compact air cleaner "LED PURE AH1" produced by NITRIDE SEMICONDUCTORS Co., Ltd. with visible light-emitting LEDs: triple white LED modules with constant-current driver "AE-LED1×3-12V" produced by Akizuki Denshi Tsusho Co., Ltd.

A specific one of the filters FT1 to FT12 and CFT1 to CFT3 is attached to the predetermined portion (portion into which the deodorizing filter is to be inserted) of the visible-light photocatalytic air cleaning apparatus. Subsequently, the air cleaning apparatus is placed in a vacuum desiccator made of an acrylic resin having a volume of 10 L, and the vacuum desiccator is hermetically sealed. Then, an ammonia gas is in through a vacuum valve such that the initial ammonia concentration inside the desiccator is 300 ppm. Subsequently, the air cleaning apparatus is started. The air inside the vacuum desiccator is sampled and the ammonia gas concentration in the air is measured using an ammonia gas detection tube at predetermined timings in order to determine the deodorizing power of the filter.

The following criteria are used for the evaluation.

A. The ammonia gas concentration after 120 minutes is less than 1 ppm

B: The ammonia gas concentration after 120 minutes is 1 ppm or more and less than 5 ppm C: The ammonia gas concentration after 120 minutes is 5 ppm or more and less than 10 ppm D: The ammonia gas concentration after 120 minutes is 10 ppm or more and less than 50 ppm E: The ammonia gas concentration after 120 minutes is 50 ppm or more Evaluation of Detachment of Photocatalyst Particles The ratio at which the photocatalyst particles become detached from the filter is determined by the following method.

The amount of Ti atoms present in the filter is measured by fluorescent X-ray analysis prior to the evaluation of deodorizing power and subsequent to the evaluation of deodorizing power (120 minutes later), and the ratio at which the photocatalyst particles become detached from the filter is calculated using the following formula.

Photocatalyst particle detachment ratio (%)= ((amount of titanium atoms present before evaluation of deodorizing power)−(amount of titanium atoms present after evaluation of deodorizing power))/(amount of titanium atoms present before evaluation of deodorizing power)×100

The following criteria are used for the evaluation.

A: Photocatalyst particle detachment ratio is less than 5%

B: Photocatalyst particle detachment ratio is 5% or more and less than 10%

C: Photocatalyst particle detachment ratio is 10% or more and less than 20%

D: Photocatalyst particle detachment ratio is 20% or more and less than 30%

E: Photocatalyst particle detachment ratio is 30% or more

Table 2 summarizes the details of each of the filters and the results of the evaluations of the filter.

TABLE 1

| Photocatalyst particles | | | Visi properties | | | IR properties |
|---|---|---|---|---|---|---|
| | Particle | | | | | Wavenumber |
| | average size $DC(\mu m)$ | Absorbance at wavelength of 450 nm | Absorbance at wavelength of 600 nm | Absorbance at wavelength of 750 nm | | at absorption peak ($cm^{-1}$) |
| Metatitanic acid particles MTA1 | 0.042 | 0.63 | 0.46 | 0.29 | | 2850/2920 |
| Metatitanic acid particles MTA2 | 0.095 | 0.58 | 0.42 | 0.23 | | 2854/2924 |
| Metatitanic acid particles MTA3 | 0.150 | 0.44 | 0.30 | 0.19 | | 2848/2918 |
| Titanium oxide particles TO1 | 0.010 | 0.62 | 0.37 | 0.28 | | 2849/2917 |

TABLE 1-continued

| Photocatalyst particles | | | | IR properties |
|---|---|---|---|---|
| | Particle | Visi properties | | Wavenumber |
| | average size DC(μm) | Absorbance at wavelength of 450 nm | Absorbance at wavelength of 600 nm | Absorbance at wavelength of 750 nm | at absorption peak (cm$^{-1}$) |
| Titanium oxide particles TO2 | 0.020 | 0.55 | 0.33 | 0.21 | 2853/2917 |
| Titanium oxide particles TO3 | 0.450 | 0.35 | 0.21 | 0.10 | 2852/2919 |
| Titanium oxide aerogel particles TOAG1 | 0.080 | 0.60 | 0.37 | 0.25 | 2855/2920 |
| Silica-titania composite aerogel particles STAG1 | 0.024 | 0.24 | 0.15 | 0.06 | 2847/2921 |
| Silica-titania composite aerogel particles STAG2 | 0.056 | 0.25 | 0.16 | 0.06 | 2851/2923 |

TABLE 2

| Filter Type | Photocatalyst particles Type | Particle average size DC (μm) | Filter medium Type | Pore size PS (mm) | Amount deposited (%) | DC/PS × 10$^{-3}$ | Air permeability (cm$^3$/cm$^2$·sec) | Visible light transmittance (%) | Optical reflectance (%) | L* value (%) | Elimination ratio (%) |
|---|---|---|---|---|---|---|---|---|---|---|---|
| FT1 | MTA1 | 0.042 | F1 | 2.8 | 20 | 0.015 | 100 | 50 | 25 | 55 | 15 |
| FT2 | MTA2 | 0.095 | F1 | 2.8 | 20 | 0.034 | 100 | 50 | 25 | 55 | 20 |
| FT3 | MTA3 | 0.150 | F1 | 2.8 | 20 | 0.054 | 100 | 50 | 25 | 55 | 35 |
| FT4 | TO1 | 0.010 | F1 | 2.8 | 20 | 0.004 | 100 | 50 | 25 | 55 | 28 |
| FT5 | TO2 | 0.020 | F1 | 2.8 | 20 | 0.007 | 100 | 50 | 25 | 55 | 38 |
| FT6 | TO3 | 0.45 | F1 | 2.8 | 20 | 0.161 | 100 | 50 | 25 | 55 | 47 |
| FT7 | TOAG1 | 0.080 | F1 | 2.8 | 20 | 0.029 | 100 | 50 | 25 | 55 | 23 |
| FT8 | STAG1 | 0.024 | F1 | 2.8 | 20 | 0.009 | 100 | 50 | 25 | 55 | 18 |
| FT9 | STAG2 | 0.056 | F1 | 2.8 | 20 | 0.020 | 100 | 50 | 25 | 55 | 20 |
| FT10 | MTA1 | 0.042 | F2 | 1.72 | 3 | 0.025 | 30 | 35 | 25 | 55 | 15 |
| FT11 | MTA1 | 0.042 | F2 | 1.72 | 29 | 0.025 | 30 | 35 | 25 | 55 | 15 |
| FT12 | MTA1 | 0.042 | F3 | 1.12 | 20 | 0.038 | 30 | 20 | 25 | 55 | 15 |
| CFT1 | MTA1 | 0.042 | CF1 | 0.650 | 10 | 0.065 | 10 | 15 | 15 | 45 | |
| CFT2 | MTA1 | 0.042 | CF2 | 6 | 10 | 0.007 | 100 | 70 | 80 | 90 | |
| CFT3 | — | — | CF3 | 1.12 | 10 | — | 30 | 10 | 25 | 55 | |

| Filter Type | Evaluations Deodorizing power | Evaluations Detachment of photocatalyst particles | Remark |
|---|---|---|---|
| FT1 | A | A | Example |
| FT2 | A | A | Example |
| FT3 | B | B | Example |
| FT4 | A | A | Example |
| FT5 | A | A | Example |
| FT6 | B | C | Example |
| FT7 | A | A | Example |
| FT8 | B | B | Example |
| FT9 | B | B | Example |
| FT10 | C | B | Example |
| FT11 | B | B | Example |
| FT12 | C | B | Example |
| CFT1 | D | | Comparative Example |
| CFT2 | D | | Comparative Example |
| CFT3 | D | | Comparative Example |

The results described in Table 2 confirm that the filters prepared in Examples have a higher deodorizing power than the filters prepared in Comparative examples.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents

What is claimed is:

1. A filter comprising:
a filter medium having an average pore size of 1 mm to 5 mm; and
photocatalyst particles deposited on the filter medium,
each photocatalyst particle containing a titanium compound particle and a metal compound bonded to a surface of the titanium compound particle with an oxygen atom,
the metal compound containing a metal atom and a hydrocarbon group,
the titanium compound particle having absorption at wavelengths of 450 nm and 750 nm in a visible absorption spectrum of the titanium compound particle.

2. The filter according to claim 1,
wherein the photocatalyst particle has absorption over an entire wavelength range of 400 nm to 800 nm in a visible absorption spectrum of the photocatalyst particle.

3. The filter according to claim 1,
wherein the photocatalyst particle has an absorption peak at 2700 cm to 3000 $cm^{-1}$ in an infrared absorption spectrum of the photocatalyst particle.

4. The filter according to claim 1,
wherein the photocatalyst particles are at least one type of particles selected from the group consisting of metatitanic acid particles, titanium oxide particles, titanium oxide aerogel particles, and silica-titanic composite aerogel particles.

5. The filter according to claim 1,
where the photocatalyst particles have an average size of 0.01 μm to 0.5 μm.

6. The filter according to claim 1,
wherein the photocatalyst particles have an average size of 0.02 μm to 0.15 μm.

7. The filter according to claim 1,
wherein a ratio of the average size of the photocatalyst particles to an average pore size of the filter medium (average particle size/average pore size) is $0.002 \times 10^{-3}$ to $0.5 \times 10^{-3}$.

8. The filter according to claim 1,
wherein a ratio of the average size of a photocatalyst particles to an average pore size of the filter medium (average particle size/average pore size) is $0.004 \times 10^{-3}$ to $0.15 \times 10^{-3}$.

9. The filter according to claim 1,
wherein the photocatalyst particle contains a metatitanic acid particle.

10. The filter according to claim 1,
wherein the filter medium is composed of a ceramic material.

11. The filter according to claim 1,
wherein a transmittance of visible light through the filter is 10% to 70%.

12. The filter according to claim 1,
wherein the filter medium has an optical reflectance of 10% to 90%.

13. The filter according to claim 1,
wherein an L* value of the filter medium in the CIE 1976 L*a*b* colorimetric system is 35% to 95%.

* * * * *